US009903992B2

(12) United States Patent
Lin et al.

(10) Patent No.: US 9,903,992 B2
(45) Date of Patent: Feb. 27, 2018

(54) LAMP

(71) Applicant: Radiant Opto-Electronics Corporation, Kaohsiung (TW)

(72) Inventors: Wei-Chen Lin, Kaohsiung (TW); Che-Wei Chang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 15/423,554

(22) Filed: Feb. 2, 2017

(65) Prior Publication Data

US 2017/0184771 A1   Jun. 29, 2017

Related U.S. Application Data

(63) Continuation-in-part of application No. 14/656,723, filed on Mar. 13, 2015, now Pat. No. 9,599,310.
(Continued)

(30) Foreign Application Priority Data

May 3, 2013  (TW) .............................. 102115900 A

(51) Int. Cl.
| *F21V 7/00* | (2006.01) |
| *F21V 8/00* | (2006.01) |
| *F21S 2/00* | (2016.01) |
| *F21V 5/04* | (2006.01) |
| *F21V 17/06* | (2006.01) |
| *F21V 19/00* | (2006.01) |

(Continued)

(52) U.S. Cl.
CPC .............. *G02B 6/0001* (2013.01); *F21K 9/61* (2016.08); *F21S 2/00* (2013.01); *F21V 5/04* (2013.01); *F21V 5/046* (2013.01); *F21V 7/005* (2013.01); *F21V 7/0091* (2013.01); *F21V 17/06* (2013.01); *F21V 19/003* (2013.01); *G02B 19/0028* (2013.01); *G02B 19/0066* (2013.01); *F21Y 2115/10* (2016.08); *G02B 27/0994* (2013.01)

(58) Field of Classification Search
CPC .......... F21V 7/0025; F21V 13/04; F21V 7/09
See application file for complete search history.

(56) References Cited

U.S. PATENT DOCUMENTS 4,698,730 A * 10/1987 Sakai ........................ F21V 5/04
                                                                257/E33.072
8,864,343 B2 * 10/2014 Inoue ...................... F21V 13/04
                                                                362/296.08
(Continued)

*Primary Examiner* — Evan Dzierzynski
(74) *Attorney, Agent, or Firm* — CKC & Partners Co., Ltd.

(57) ABSTRACT

A light guide element and a lamp are provided. The light guide element includes a light-incident surface, a light-emitting surface, an outer surface and an inner surface. The light-incident surface has a first outer peripheral edge and a first inner peripheral edge. The light-emitting surface is opposite to the light-incident surface and has a second outer peripheral edge and a second inner peripheral edge. The outer surface connects the first outer peripheral edge and the second outer peripheral edge. The inner surface connects the first inner peripheral edge and the second inner peripheral edge. A first opening defined by the inner surface adjacent to the first inner peripheral edge is larger than a second opening defined by the inner surface adjacent to the second inner peripheral edge.

26 Claims, 32 Drawing Sheets

Related U.S. Application Data which is a continuation-in-part of application No. 13/972,926, filed on Aug. 22, 2013, now Pat. No. 9,033,552.

(51) Int. Cl.
| | |
|---|---|
| *G02B 19/00* | (2006.01) |
| *F21K 9/61* | (2016.01) |
| *G02B 27/09* | (2006.01) |
| *F21Y 115/10* | (2016.01) |

(56) References Cited

U.S. PATENT DOCUMENTS

2006/0209558 A1\* 9/2006 Chinniah ............. F21S 48/215
    362/545
2013/0229808 A1\* 9/2013 Wang ...................... F21V 5/04
    362/311.01

\* cited by examiner

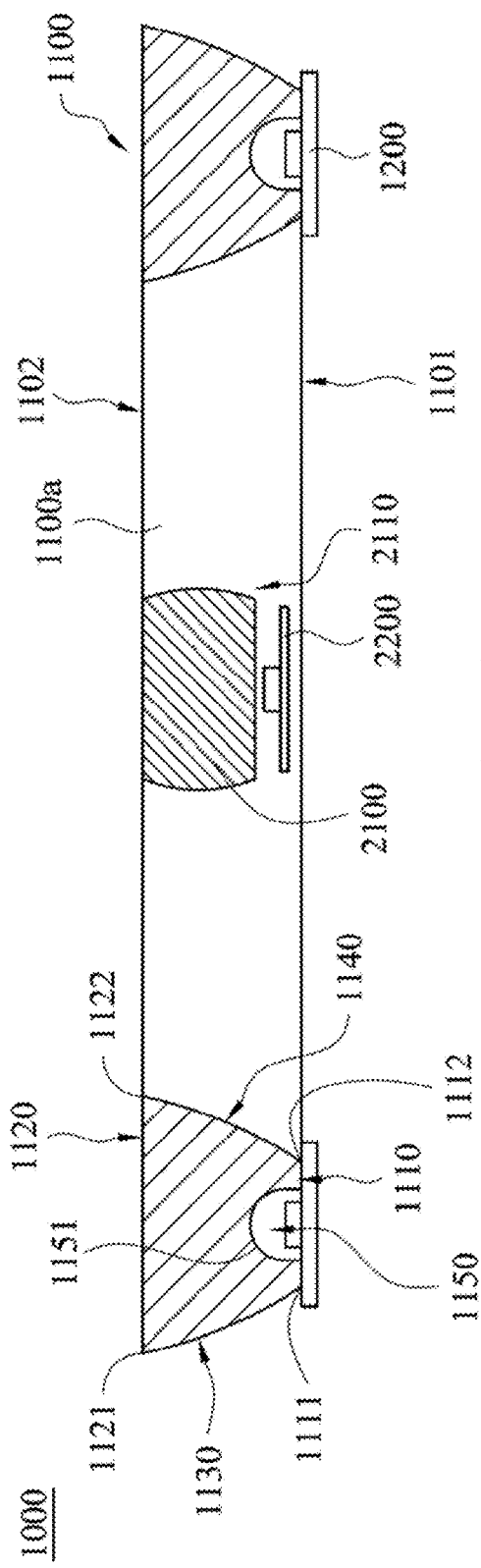
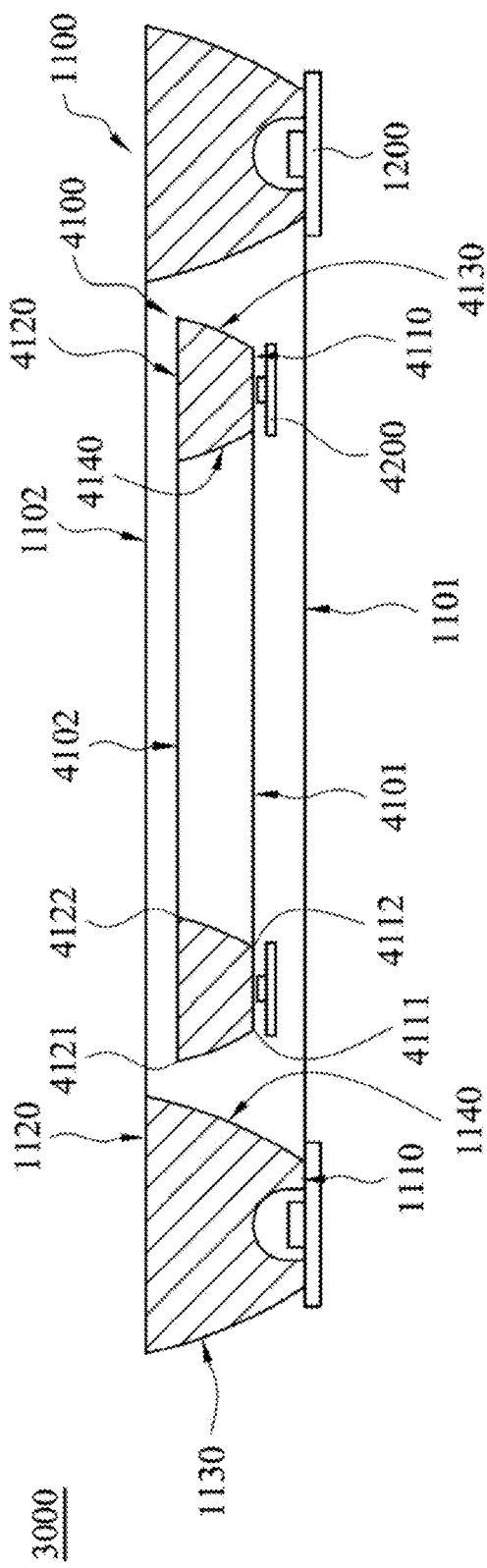
FIG. 13
FIG. 14

LAMP

RELATED APPLICATIONS

This application is a continuation-in-part application of U.S. application Ser. No. 14/656,723, filed on Mar. 13, 2015, which is a continuation-in-part application of U.S. application Ser. No. 13/972,926, filed on Aug. 22, 2013, now U.S. Pat. No. 9,033,552, which claims priority to Taiwan Application Serial Number 102115900, filed May 3, 2013, The entire disclosures of all the above applications are hereby incorporated by reference herein

BACKGROUND

Field of the Invention

The present invention relates to a light guide element, and more particularly to a light guide element for controlling a light distribution and the application thereof.

Description of Related Art

A conventional lamp consists essentially of a bulb and a reflecting mask. The reflecting mask mainly functions to guide light generated from the bulb to a required direction and to change light distributions generated while the bulb irradiates. However, the light distributions varied through the reflecting mask have limited diversities, and are usually a light-concentrating type, thus having limited applicability of the lamp.

Another conventional lamp can change a light distribution generated from a light source by collaborating with a secondary optical element. However, in this structure, a recess has to be disposed in a center of the optical element to receive the light source for achieving the object of light distribution adjustment. Thus, the secondary optical element has to match with different types or quantities of light sources to change the whole structure design, thus resulting in cost increase.

Hence, a light guide element is needed to overcome the foregoing problems.

SUMMARY

One aspect of the present invention is to provide a light guide element for controlling a light distribution by using a total reflection characteristic of a light beam to change a travel direction of the light beam, thus achieving an object of adjusting the light form emitted from the light guide element. Therefore, applications of the light guide element may meet irradiation requirements of various light beam angles, and also reduce power consumption.

Another aspect of the present invention is to provide a light guide element for controlling a light distribution by using profile curves to change curved surface shapes of a first reflecting surface, a second reflecting surface and a light-emitting surface, thereby adjusting a travel direction of a light beam in the light guide element to achieve an object of adjusting the light form emitted from the light guide element.

Another aspect of the present invention is to provide a light guide element for controlling a light distribution by using a Bezier curve function to define respective profile curves, thus not only simplifying definition rules of respective curved surfaces but also controlling an overall profile shape of the light guide element in an intuitive manner.

According to the aforementioned objects, the present invention provides a light guide element for controlling a light distribution. The light guide element includes a light-incident surface, a light-emitting surface, an outer surface and an inner surface. The light-incident surface has a first outer peripheral edge and a first inner peripheral edge. The light-emitting surface is opposite to the light-incident surface and has a second outer peripheral edge and a second inner peripheral edge. The outer surface connects the first outer peripheral edge and the second outer peripheral edge. The inner surface connects the first inner peripheral edge and the second inner peripheral edge. A first opening defined by the inner surface adjacent to the first inner peripheral edge is larger than a second opening defined by the inner surface adjacent to the second inner peripheral edge.

According to an embodiment of the present invention, the first opening is located at the light-incident surface, the second opening is located at the light-emitting surface, and a diameter of the first opening is larger than a diameter of the second opening.

According to an embodiment of the present invention, an annular trench is disposed on the light-incident surface.

According to an embodiment of the present invention, the light guide element has a first segment with curvature and a second segment without curvature.

According to an embodiment of the present invention, the second segment is more protruding than the first segment.

According to an embodiment of the present invention, the light guide element further includes a convex lug adjacent to the light-incident surface.

According to the aforementioned objects, the present invention provides a lamp. The lamp includes a base, a light source, a socket and the aforementioned light guide element. The light source is disposed on the base. The socket is disposed on the base and fixes the light source on the base. The light guide element is engaged with the socket, in which the light source faces the light-incident surface of the light guide element.

According to an embodiment of the present invention, the first opening is located at the light-incident surface, the second opening is located at the light-emitting surface, and a diameter of the first opening is larger than a diameter of the second opening.

According to an embodiment of the present invention, an annular trench is disposed on the light-incident surface, and the light source s located in the annular trench.

According to an embodiment of the present invention, the light guide element has a first segment with curvature and a second segment without curvature.

According to an embodiment of the present invention, the second segment is more protruding than the first segment.

According to an embodiment of the present invention, the light guide element further includes a convex lug adjacent to the light-incident surface, the socket further includes a flange engaged with the convex lug.

According to an embodiment of the present invention, light source includes a circuit board and a plurality of light emitting diodes disposed on the circuit board in annular arrangement.

According to an embodiment of the present invention, the circuit board has a protruding portion, and the socket has a notch engaged with the protruding portion of the circuit board.

According to an embodiment of the present invention, the socket is fixed on the base by screwing members.

BRIEF DESCRIPTION OF THE DRAWINGS

The invention can be more fully understood by reading the following detailed description of the embodiment, with reference made to the accompanying drawings as follows:

FIG. 13 is a cross-sectional view showing a lamp in accordance with a second embodiment of the present invention;

FIG. 14 is a cross-sectional view showing a lamp in accordance with a third embodiment of the present invention;

DETAILED DESCRIPTION

Figure 1A:
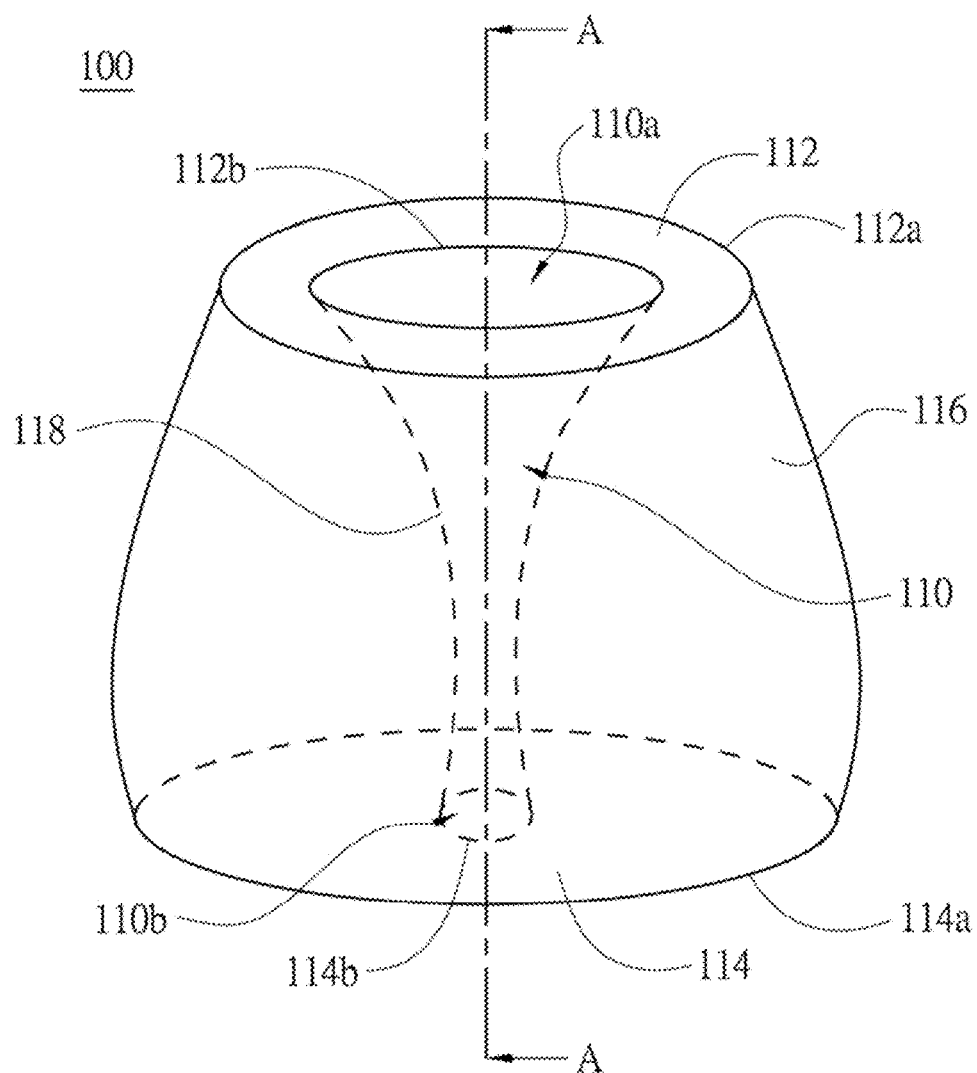
FIG. 1A is a schematic structural diagram showing a light guide element in accordance with a first embodiment of the present invention.
Figure 1B:
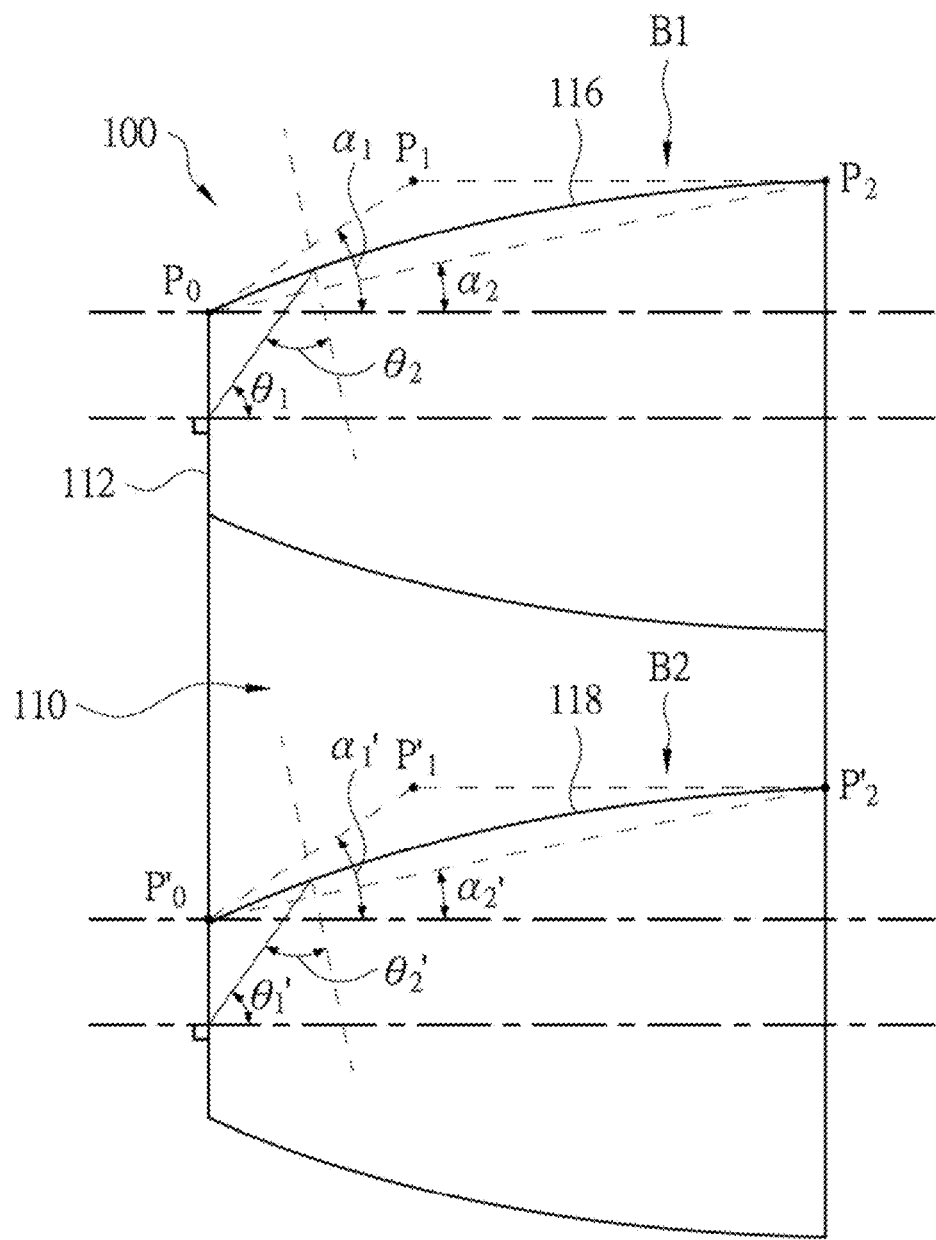
FIG. 1B is a schematic cross-sectional view of the light guide element viewed along a line A-A in FIG. 1A.

Referring to FIGS. 1A and 1B, FIG. 1A is a schematic structural diagram of a light guide element 100 in accordance with a first embodiment, and FIG. 1B is a schematic cross-sectional view of the light guide element 100 viewed along a line A-A in FIG. 1A. In the present embodiment, the light guide element 100 is suitable for use in guiding a light beam and enabling the light beam to be totally reflected in the light guide element 100, so as to generate different light beam angles. In the present embodiment, the light beam may come from a light source, such as a light emitting diode (LED). The light guide element 100 is an annular frustum having a through hole 110. The light guide element 100 includes a light-incident surface 112, a light-emitting surface 114, a first reflecting surface 116 and a second reflecting surface 118. The through hole 110 forms a first opening 110a on the light-incident surface 112, and the light-incident surface 112 has a first outer peripheral edge 112a and a first inner peripheral edge 112b. The light-emitting surface 114 is opposite to the light-incident surface 112. The through hole 110 forms a second opening 110b on the light-emitting surface 114, and the light-emitting surface 114 has a second outer peripheral edge 114a and a second inner peripheral edge 114b.

The first reflecting surface 116 connects the first outer peripheral edge 112a and the second outer peripheral edge 114a, and the first reflecting surface 116 is a curved surface constructed by a first profile curve B1. The first profile curve B1 is a connecting line from a first initial point on the first outer peripheral edge 112a to a first terminating point on the second outer peripheral edge 114a. It is noted that the first profile curve B1 in the present embodiment is a curve of intersection between the first reflecting surface 116 and any cut plane which is perpendicular to the light-incident surface 112 and passes through a center of the light guide element 100. The second reflecting surface 118 connects the first inner peripheral edge 112b and the second inner peripheral edge 114b, and the second reflecting surface 118 is a curved surface constructed by a second profile curve B2. The second profile curve B2 is a connecting line from a second initial point on the first inner peripheral edge 112b to a second terminating point on the second inner peripheral edge 114b. Similarly, the second profile curve B2 in the present embodiment is a curve of intersection between the second reflecting surface 118 and any cut plane which is perpendicular to the light-incident surface 112 and passes through the center of the light guide element 100.

In one embodiment, the first profile curve B1 is defined by a Bezier curve function. Bezier curves are various curves illustrated mainly by using three or more points of position coordinates with different weights according to the Bezier curve function. The Bezier curve function is shown as $$B(t) = \frac{\sum_{i=0}^{n} \binom{n}{i} t^i (1-t)^{n-i} P_i W_i}{\sum_{i=0}^{n} \binom{n}{i} t^i (1-t)^{n-i} W_i} \quad (1)$$

where "$P_i$" represents a position coordinate of an $i^{th}$ point in the Bezier curve function. In the present embodiment, there is at least one first control point between the first initial point and the first terminating point. For example, when a total number of the at least one first control point is one, the first control point $P_1$ is located between the first initial point $P_0$ and the first terminating point $P_2$. The position of the first control point is mainly used for determining a radian of the first profile curve B1'. For example, when a total number of the at least one first control point is one, a position coordinate of the first initial point $P_0$ is $(X_0, Y_0)$, a position coordinate of the first control point $P_1$ is $(X_1, Y_1)$, and a position coordinate of the first terminating point $P_2$ is $(X_2, Y_2)$. In the Bezier curve function, "n" represents the total number of the at least one first control point plus 1, and "$W_i$" represents a weight of a point $P_i$. For example, when the total number of the at least one first control point is 2, "n" is 3. In addition, "$W_1$" represents a weight of the first control point $P_1$ which can adjust the shape of the first profile curve B1. As shown in FIG. 1B, the weight $W_1$ in a connecting line from the first initial point $P_0$ to the first control point $P_1$ is defined as 1, and the weight $W_1$ in a connecting line from the first initial point $P_0$ to the first terminating point $P_2$ is defined as 0. If the weight of the first control point $P_1$ approaches 1, the first profile curve B1 will trend to the connecting line from the first initial point. $P_0$ to the first control point $P_1$. Similarly, if the weight of the first control point $P_1$ approaches 0, the first profile curve B1 will trend to the connecting line from the first initial point $P_0$ to the first terminating point $P_2$. In the Bezier curve function, "t" represents a ratio of a length between a predetermined point and the first initial point to a total length of the first profile curve B1. The aforementioned "total length" is a length of the connecting line from the first initial point to the first terminating point. Therefore, "t" may represent a corresponding value of a position of any point on the first profile curve B1 between the first initial point and the first terminating point.

After the first initial point $P_0$, the first control point $P_1$ and the first terminating point $P_2$ are defined, the first profile curve B1 are further defined by constraints shown as:

$$X_0 \le X_1 \le X_2; \quad (2)$$
$$90° \ge \alpha_1 \ge \alpha_2;$$
$$0 \le \alpha_1 = \theta_1 + \theta_2 - 90°;$$
$$\theta_1 = \sin^{-1}\left(\frac{1}{n_{material}}\right);$$
$$\theta_2 \ge 90° - \theta_1; \text{ and}$$
$$0 \le W_i \le 1.$$

Referring to FIG. 1B again, $\alpha_1$ represents an angle included between a horizontal line and the connecting line from the first initial point $P_0$ to the first control point $P_1$. $\alpha_2$ represents an angle included between a horizontal line and the connecting line from the first initial point $P_0$ to the first terminating point $P_2$. $\theta_1$ represents a refracting angle of the light beam entering from outside of the light guide element 100. $\theta_2$ represents an incident angle of the light beam which is incident toward the first reflecting surface 116 after entering the right guide element 100. $n_{material}$ represents a refractive index of the light guide element 100. Therefore, adjusting each parameter value of the constraints may change the shape of the first reflecting surface 116.

Referring to FIGS. 1A and 1B again, in one embodiment, the second profile curve B2 may be the same curve as the first profile curve B1. Both the first profile curve B1 and the second profile curve B2 are defined by the aforementioned Bezier curve function. For clarity of explanation, $P'_i$, $X'_i$ and $Y'_i$ are used below to represent $P_i$, $X_i$ and $Y_i$ in equations (1) and (2).

In the present embodiment, there is at least one second control point between the second initial point and the second terminating point. For example, when a total number of the at least one first control point is one, the second control point $P'_1$ is located between the second initial point $P'_0$ and the second terminating point $P'_2$. The position of the second control point is mainly used for determining a radian of the second profile curve B2. For example, when a total number of the at least one second control point is one, a position coordinate of the second initial point $P'_0$ is $(X'_0, Y'_0)$, a position coordinate of the second control point $P'_1$ is $(X'_1, Y'_1)$, and a position coordinate of the second terminating point $P'_2$ is $(X'_2, Y'_2)$. In the Bezier curve function, "n" represents the total number of the at least one second control point plus 1. In addition, "$W_i$" represents a weight of the second control point $P'_i$ which can adjust the shape of the second profile curve B2. As shown in FIG. 1B, the weight $W_1$ in a connecting line from the second initial point $P'_0$ to the second control point $P'_1$ is defined as 1, and the weight $W_1$ in a connecting line from the second initial point $P'_0$ to the second terminating point $P'_2$ is defined as 0. If the weight of the second control point $P'_1$ approaches 1, the second profile curve B2 will trend to the connecting line from the second initial point $P'_0$ to the second control point $P'_1$. Similarly, if the weight of the second control point $P'_1$ approaches 0, the second profile curve B2 will trend to the connecting fine from the second initial point P'$_0$ to the second terminating point P'$_2$. In the Bezier curve function, "t" represents a ratio of a length between a predetermined point and the second initial point to a total length of the second profile curve B2. The aforementioned "total length" is a length of the connecting line from the second initial point to the second terminating point. Therefore, "t" may represent a corresponding value of a position of any point on the second profile curve B2 between the second initial point and the second terminating point.

After the second initial point P'$_0$, the second control point P'$_1$ and the second terminating point P'$_2$, are defined, the second profile curve B2 are further defined by constraints shown as:

$$X'_0 \leq X'_1 \leq X'_2; \quad (3)$$
$$90° \geq \alpha'_1 \geq \alpha'_2;$$
$$0 \leq \alpha'_1 = \theta'_1 + \theta'_2 - 90°;$$
$$\theta'_1 = \sin^{-1}\left(\frac{1}{n_{material}}\right);$$
$$\theta'_2 \geq 90° - \theta'_1; \text{ and}$$
$$0 \leq W_i \leq 1.$$

Referring to FIG. 1B again, $\alpha_1'$ represents an angle included between a horizontal line and the connecting line from the second initial point P$_0'$ to the first control point P'$_1$. $\alpha_2'$ represents an angle included between a horizontal line and the connecting line from the second initial point P'$_0$ to the second terminating point P'$_2$. $\theta_1'$ represents a refracting angle of the light beam entering from outside of the light guide element 100. $\theta_2'$ represents an incident angle of the light beam which is incident toward the second reflecting surface 118 after entering the light guide element 100. $n_{material}$ represents a refractive index of the light guide element 100. Therefore, adjusting each parameter value of the constraints may change the shape of the second reflecting surface 118.

It can be known from the above descriptions that, the second profile curve B2 is defined by the same Bezier curve function and the same constraints for the first profile curve B1. Therefore, in one embodiment, the second profile curve B2 and the first profile curve B1 can have the same profile, so that the second reflecting surface 118 and the first reflecting surface 116 are symmetrical. However, in another embodiment, the second profile curve B2 and the first profile curve B1 may have different profiles defined by different parameter values, so that the second reflecting surface 118 and the first reflecting surface 116 are not symmetrical.

Figure 2A:
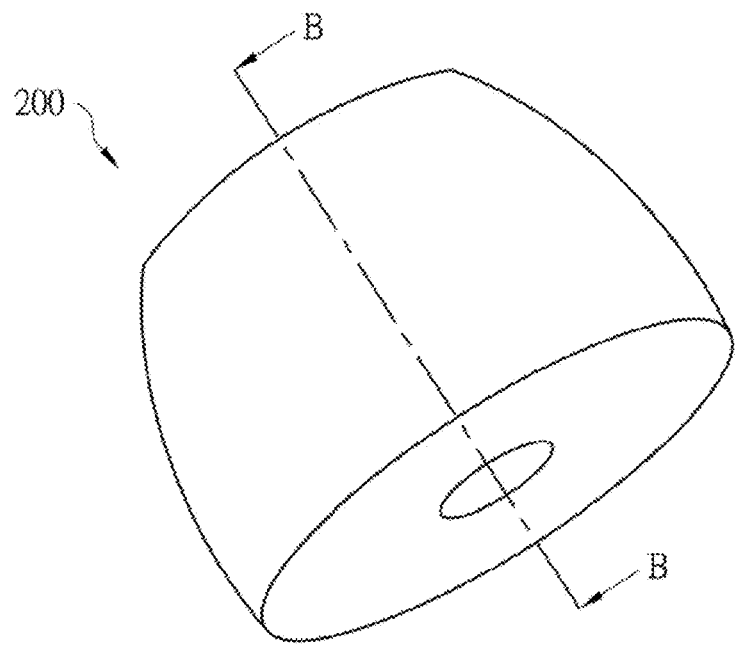
FIG. 2A is a schematic structural diagram showing a light guide element in accordance with a second embodiment of the present invention.
Figure 2B:
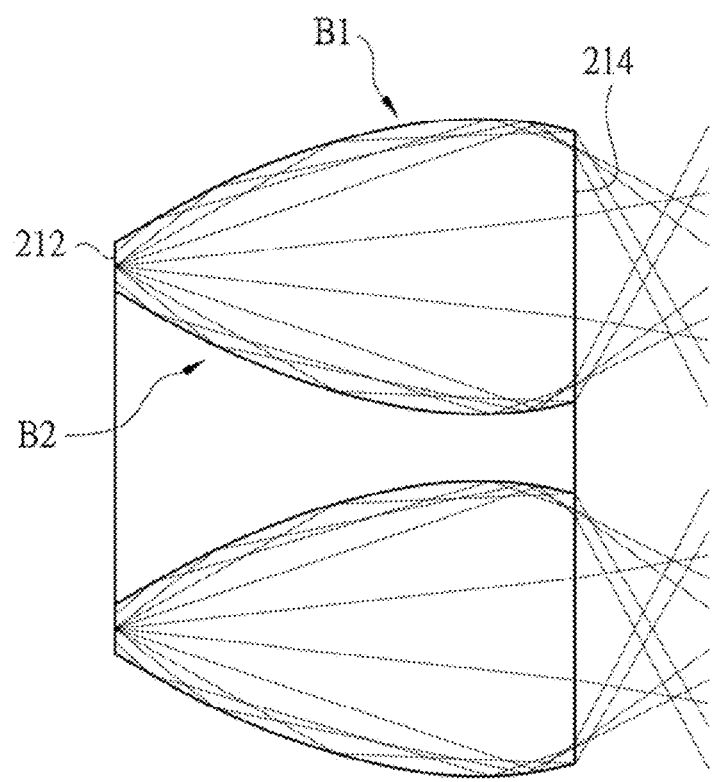
FIG. 2B is a schematic cross-sectional view of the light guide element viewed along a line B-B in FIG. 2A.
Figure 2C:
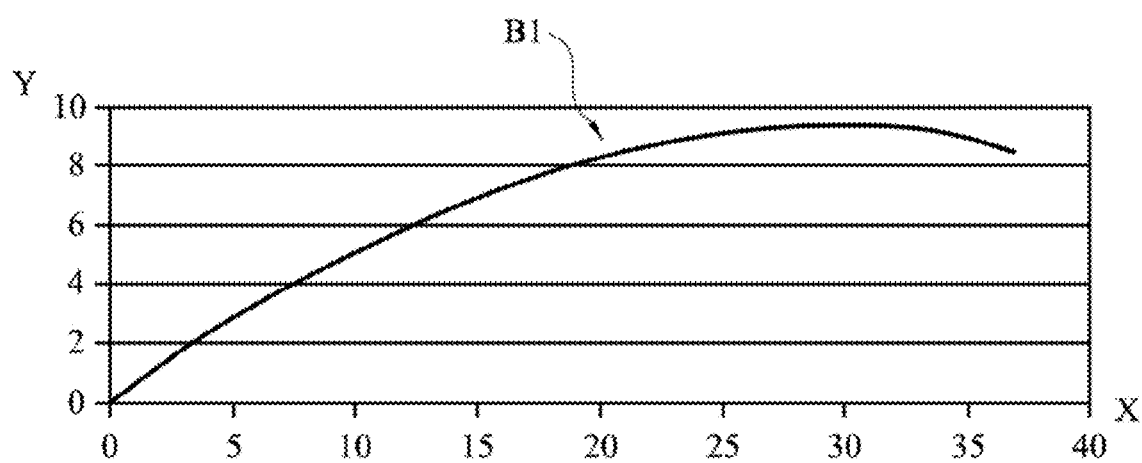
FIG. 2C is a schematic diagram of a first profile curve in accordance with the second embodiment of the present invention.
Figure 2D:
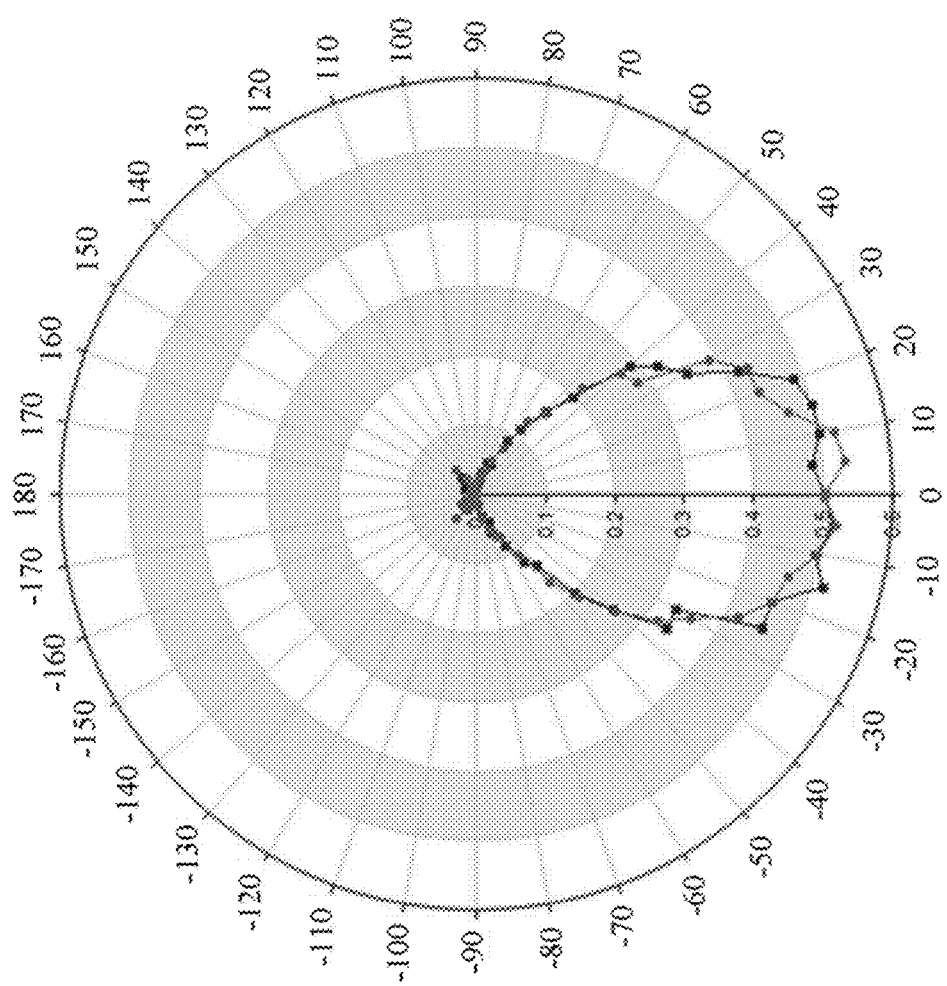
FIG. 2D is a candlepower distribution curve generated from the light guide element in accordance with the second embodiment of the present invention.

Referring to FIG. 2A to FIG. 2D, FIG. 2A is a schematic structural diagram a light guide element 200 in accordance with a second embodiment of the present invention; FIG. 2B is a schematic cross-sectional view of the light guide element 200 viewed along a line B-B in FIG. 2A; FIG. 2C is a schematic diagram of a first profile curve in accordance with the second embodiment of the present invention; and FIG. 2D is a candlepower distribution curve generated from the light guide element in accordance with the second embodiment of the present invention.

In the second embodiment, as shown in FIG. 2C, the first profile curve B1 of the light guide element 200 is formed from the parameter values which are P$_0$=(0,0), P$_1$=(21.3,13), P$_2$=(36,8.5) and W$_1$=0.45. The second profile curve B2 and the first profile curve B1 are symmetrical. As shown in FIG. 2B, the light beam enters the light guide element 200 from a light-incident surface 212, and is reflected out of the light-emitting surface 214 by the light guide element 200. In the present embodiment, the light beam is emitted from the light guide element 200 at a light beam angle of about 82 degrees.

Figure 3A:
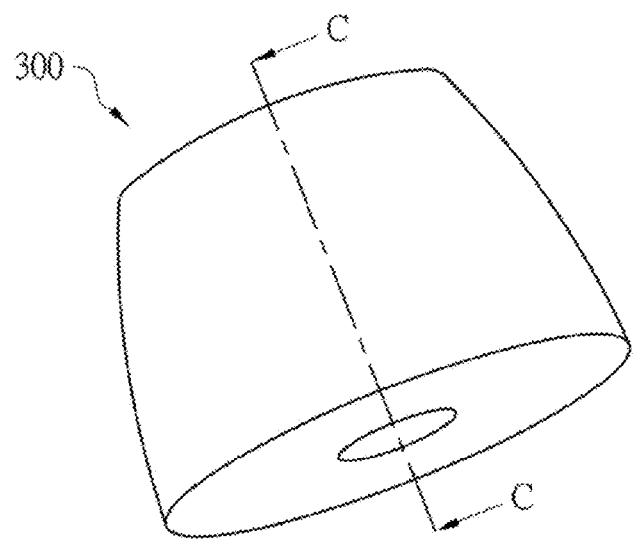
FIG. 3A is a schematic structural diagram showing a light guide element in accordance with a third embodiment of the present invention.
Figure 3B:
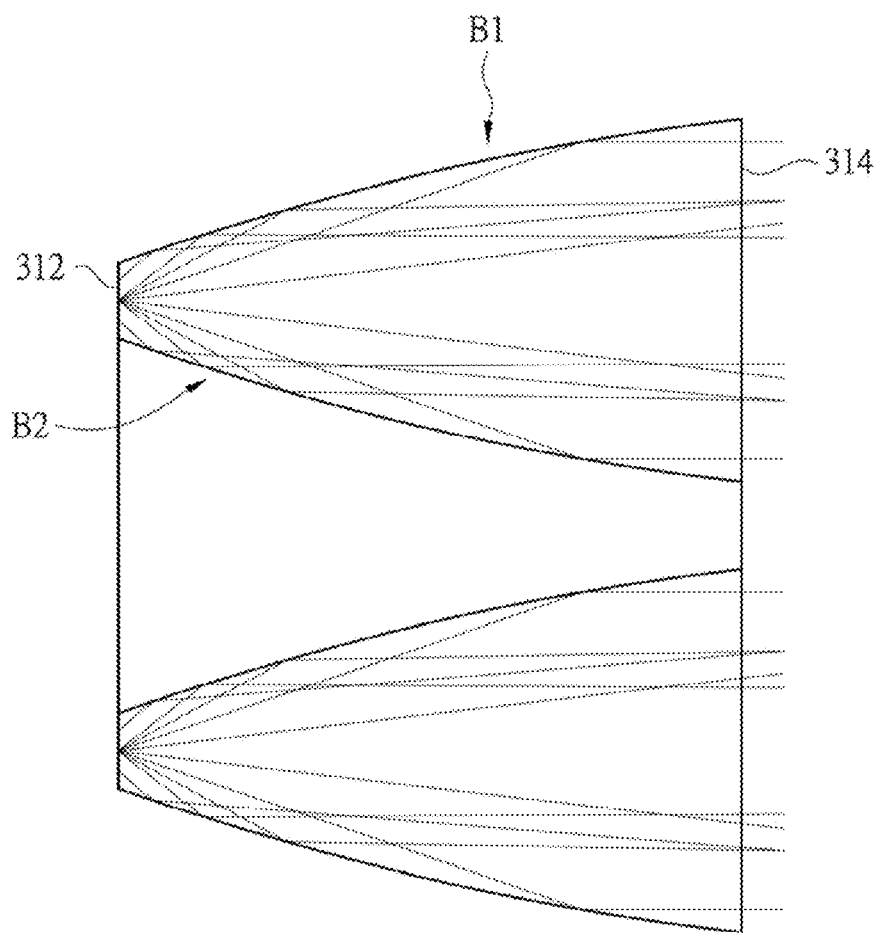
FIG. 3B is a schematic cross-sectional view of the light guide element viewed along a line C-C in FIG. 3A.
Figure 3C:
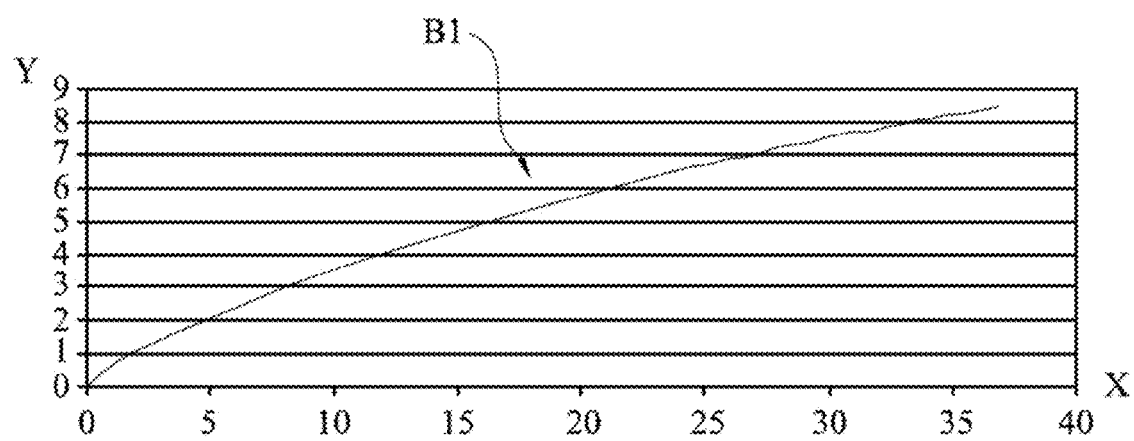
FIG. 3C is a schematic diagram of a first profile curve in accordance with the third embodiment of the present invention.
Figure 3D:
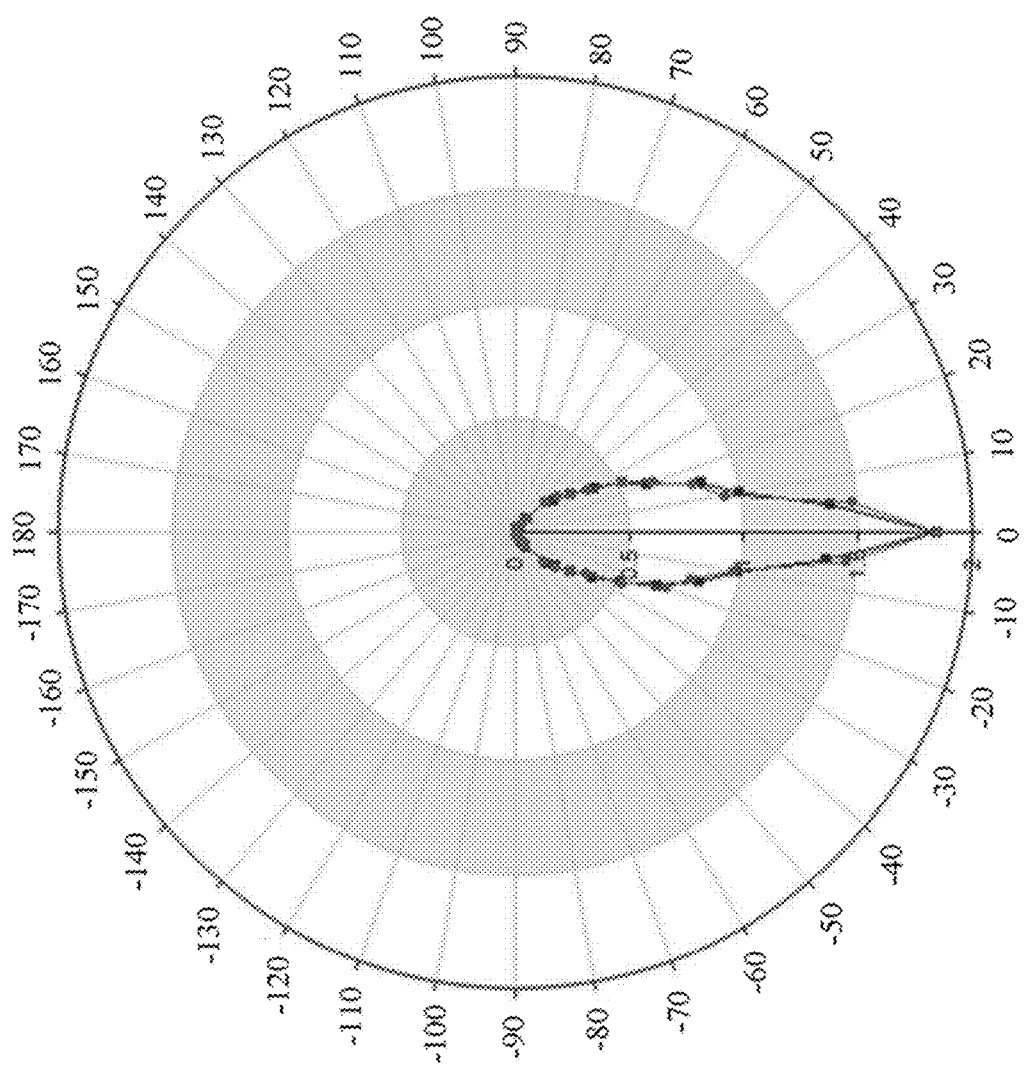
FIG. 3D is a candlepower distribution curve generated from the light guide element in accordance with the third embodiment of the present invention.

Referring to FIG. 3A to FIG. 3D, FIG. 3A is a schematic structural diagram of a light guide element 300 in accordance with a third embodiment of the present invention; FIG. 3B is a schematic cross-sectional view of the light guide element 300 viewed along a line C-C in FIG. 3A; FIG. 3C is a schematic diagram of a first profile curve in accordance with the third embodiment of the present invention; and FIG. 3D is a candlepower distribution curve generated from the light guide element in accordance with the third embodiment of the present invention.

In the third embodiment, as shown in FIG. 3C, the first profile curve B1 of the light guide element 300 is formed from the parameter values which are P$_0$=(0,0), P$_1$=(7.6,4.6), P$_2$=(36,8.5) and W$_1$=0.45. The second profile curve B2 and the first profile curve B1 are symmetrical. As shown in FIG. 3B, the light beam enters the light guide element 300 from a light-incident surface 312, and is reflected out of the light-emitting surface 314 by the light guide element 300. In the present embodiment, the light beam is emitted from the light guide element 300 at a light beam angle of about 24 degrees.

Figure 4A:
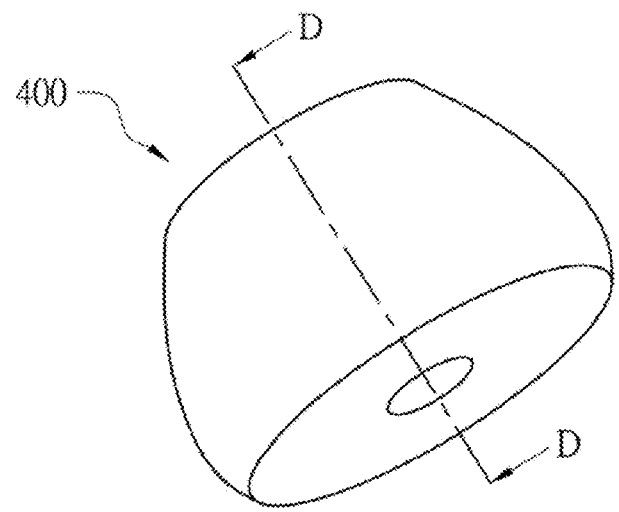
FIG. 4A is a schematic structural diagram showing a light guide element in accordance with a fourth embodiment of the present invention.
Figure 4B:
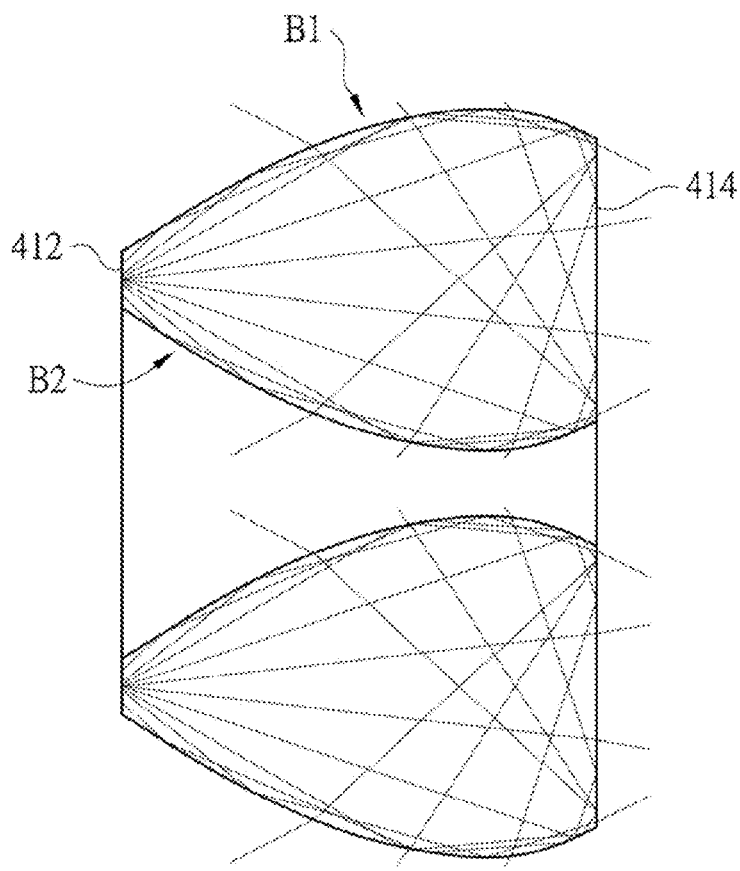
FIG. 4B is a schematic cross-sectional view of the light guide element viewed along a line D-D in FIG. 4A.
Figure 4C:
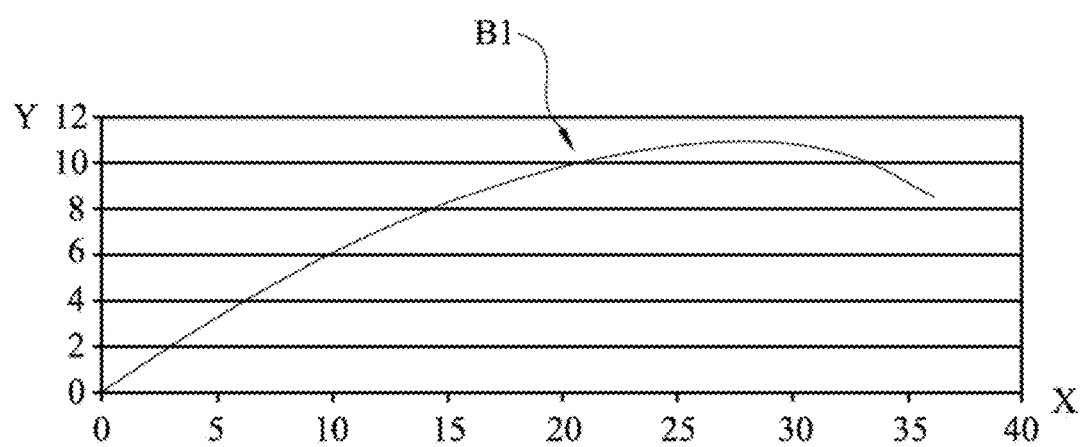
FIG. 4C is a schematic diagram of a first profile curve in accordance with the fourth embodiment of the present invention.
Figure 4D:
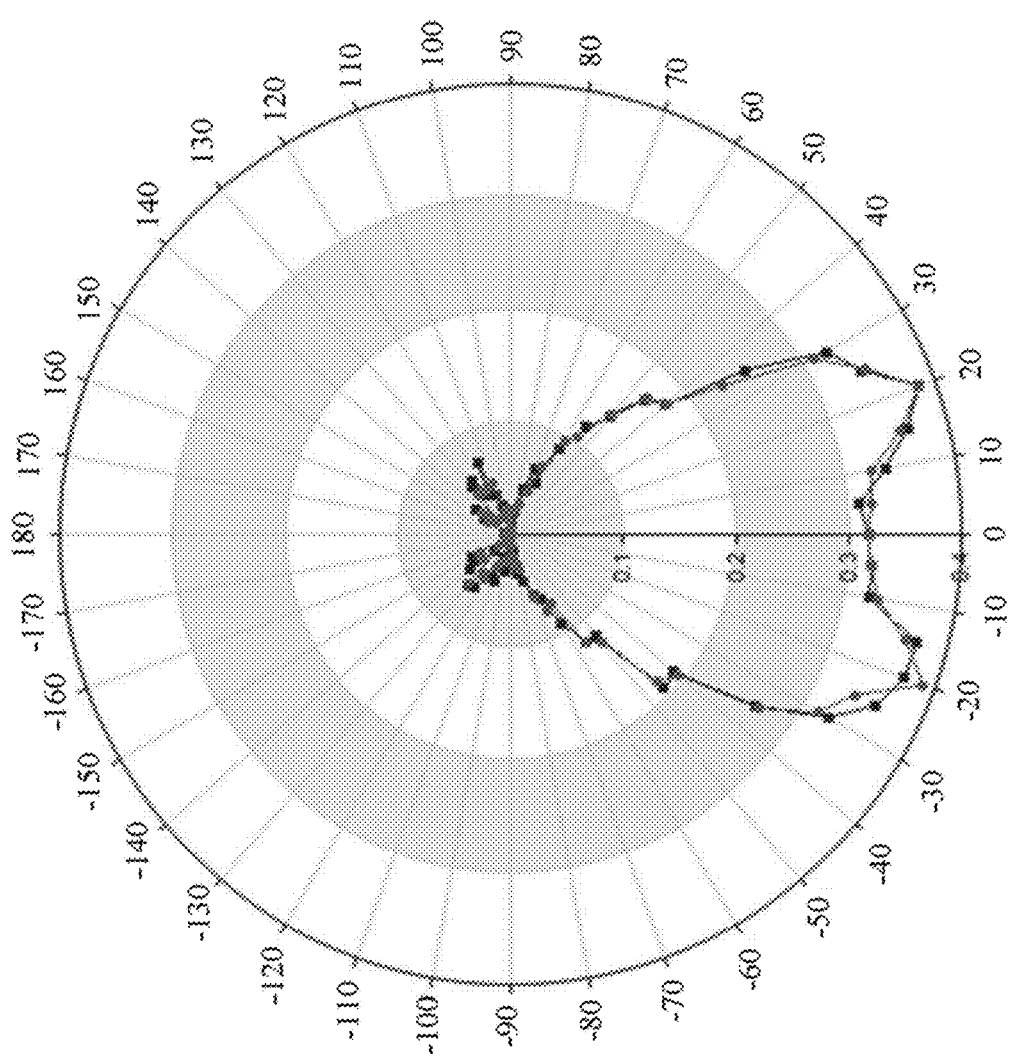
FIG. 4D is a candlepower distribution curve generated from the light guide element in accordance with the fourth embodiment of the present invention.

Referring to FIG. 4A to FIG. 4D, FIG. 4A is a schematic structural diagram of a light guide element 400 in accordance with a fourth embodiment of the present invention; FIG. 4B is a schematic cross-sectional view of the light guide element 400 viewed along a line D-D in FIG. 4A; FIG. 4C is a schematic diagram of a first profile curve in accordance with the fourth embodiment of the present invention; and FIG. 4D is a candlepower distribution curve generated from the light guide element in accordance with the fourth embodiment of the present invention.

In the fourth embodiment, as shown in FIG. 4C, the first profile curve B1 of the light guide element 400 is formed from the parameter values which are P$_0$=(0,0), P$_1$=(24.6, 17.2), P$_2$=(36,8.5) and W$_1$=0.45. The second profile curve B2 and the first profile curve B1 are symmetrical. As shown in FIG. 4B, the light beam enters the light guide element 400 from a light-incident surface 412, and is reflected out of the light-emitting surface 414 by the light guide element 400. In the present embodiment, the light beam is emitted from the light guide element 400 at a light beam angle of about 93 degrees.

Figure 5A:
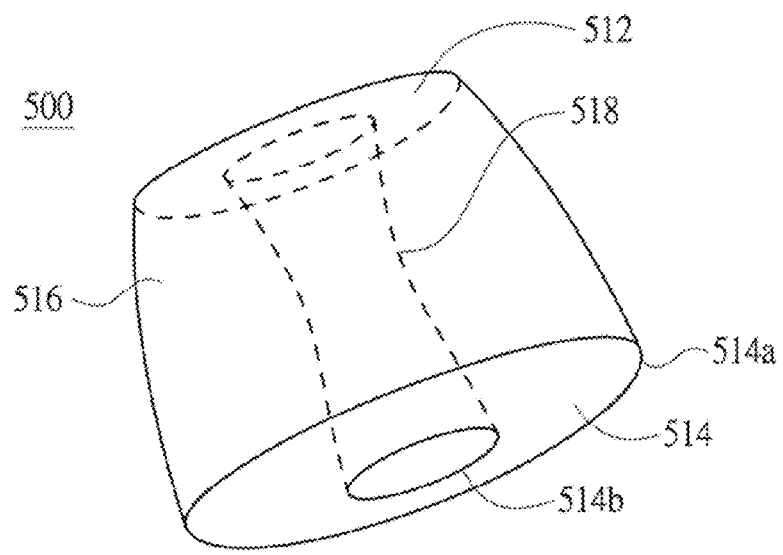
FIG. 5A is a schematic structural diagram showing a light guide element in accordance with a fifth embodiment of the present invention.
Figure 5B:
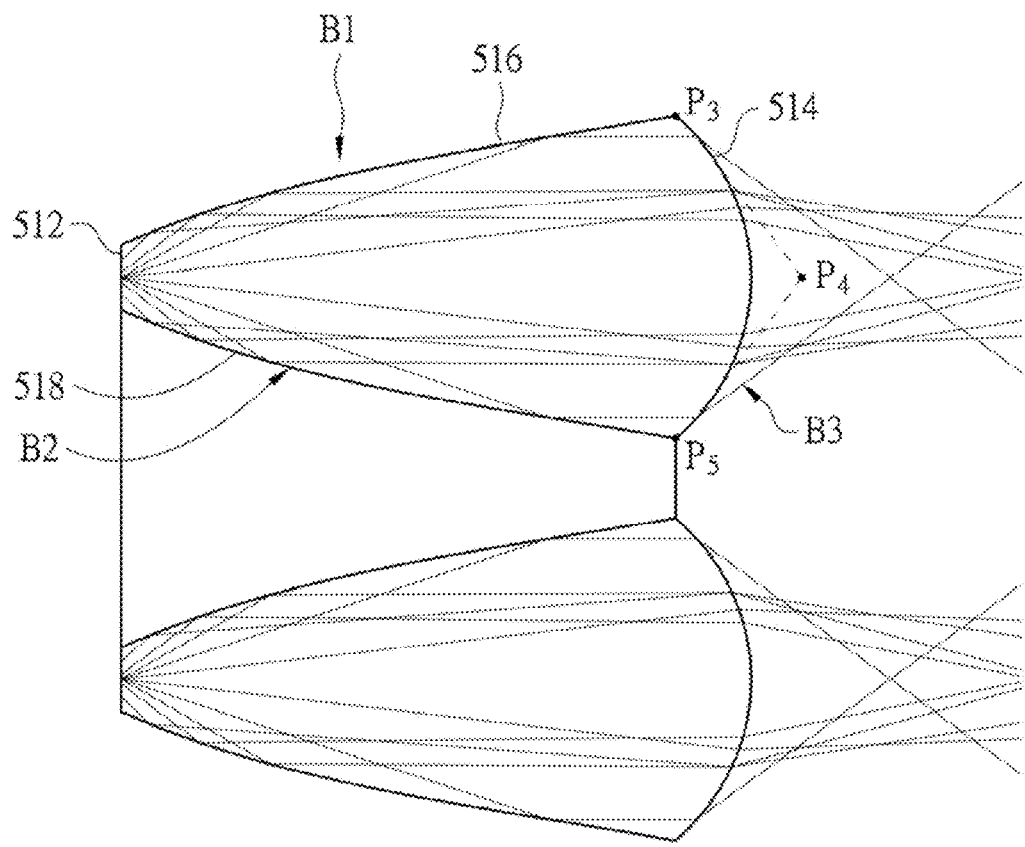
FIG. 5B is a schematic cross-sectional view of the light guide element viewed along a line E-E of FIG. 5A.
Figure 5C:
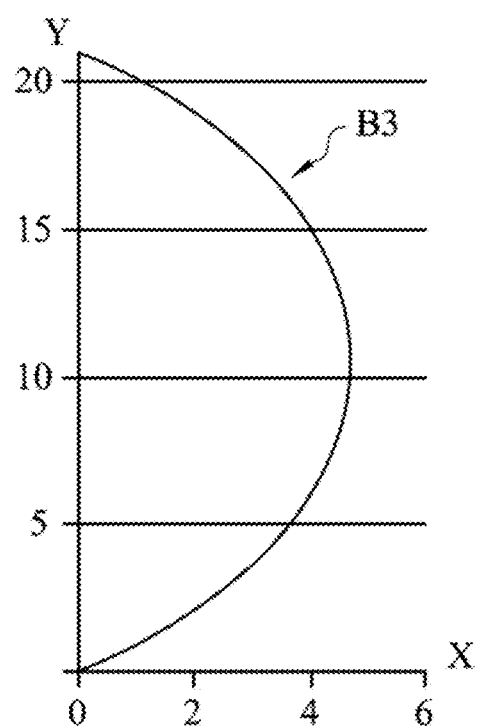
FIG. 5C is a schematic diagram of a first profile curve in accordance with the fifth embodiment of the present invention.
Figure 5D:
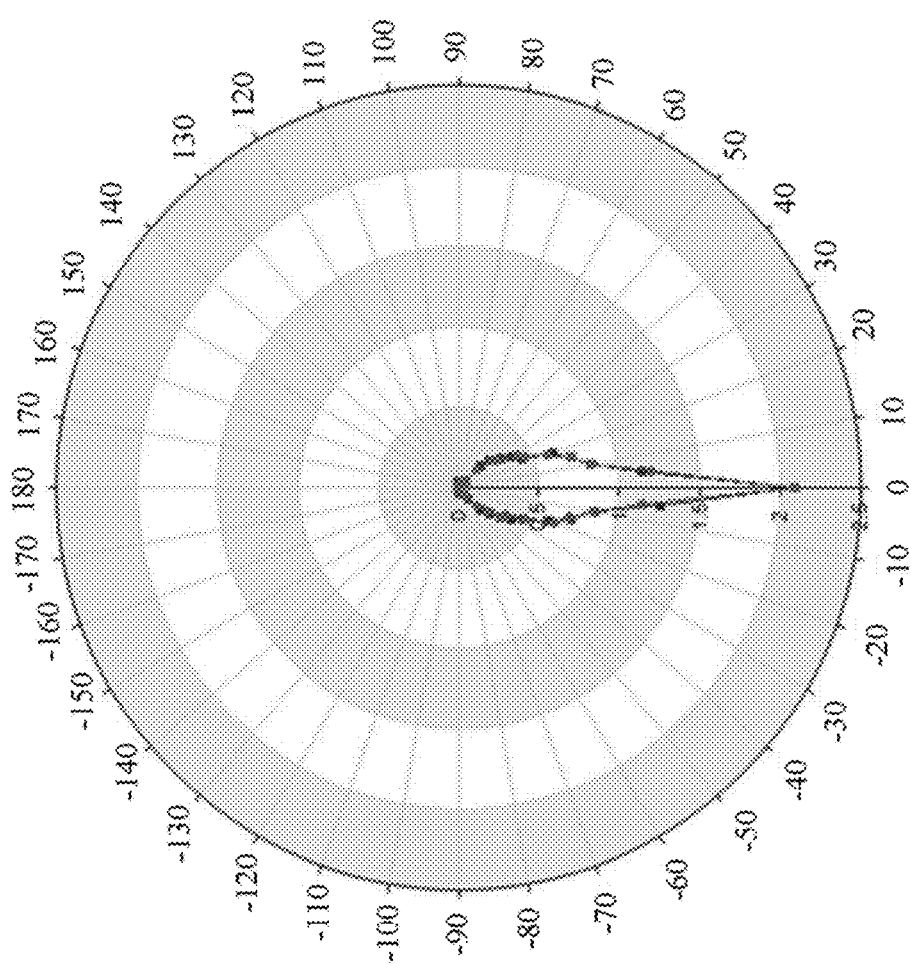
FIG. 5D is a candlepower distribution curve generated from the light guide element in accordance with the fifth embodiment of the present invention.

Referring to FIG. 5A to FIG. 5D, FIG. 5A is a schematic structural diagram of a light guide element 500 in accordance with a fifth embodiment of the present invention; FIG. 5B is a schematic cross-sectional view of the light guide element 500 viewed along a line E-E in FIG. 5A; FIG. 5C is a schematic diagram of a first profile curve in accordance with the fifth embodiment of the present invention; and FIG. 5D is a candlepower distribution curve generated from the light guide element in accordance with the fifth embodiment of the present invention.

In the fifth embodiment, the light guide element 500 is similar to the light guide element 100. The light guide element 500 includes a light-incident surface 512, a light-emitting surface 514, a first reflecting surface 516 and a second reflecting surface 518. The first reflecting surface 516 and the second reflecting surface 518 are similar to the first reflecting surface 116 and the second reflecting surface 118. The first reflecting surface 516 and the second reflecting surface 518 are constructed by the same first profile curve B1 and the same second profile curve B2 which are described before, and will not be repeated herein. In the present embodiment, the light-emitting surface 514 has an outer peripheral edge 514a and an inner peripheral edge 514b. The light-emitting surface 514 is constructed by a third profile curve B3. The third profile curve B3 is a connecting line from a third initial point on the outer peripheral edge 514a to a third terminating point on the inner peripheral edge 514b.

It is noted that the third profile curve B3 in the present embodiment is a curve of intersection between the light-emitting surface 514 and any cut plane which is perpendicular to the light-incident surface 512 and passes through a center of the light guide element 500. In one embodiment, the third profile curve B3 and the first profile curve B1 may be defined by the same profile curve. Both the first profile curve B1 and the third profile curve B3 are defined by the aforementioned Bezier curve function.

In the present embodiment, there is at least one third control point between the third initial point and the third terminating point. For example, when a total number of the at least one third control point is one, the third control point $P_4$ is located between the third initial point $P_3$ and the third terminating point $P_5$. The position of the third control point is mainly used for determining a radian of the third profile curve B3. For example, when a total number of the at least one third control point is one, a position coordinate of the third initial point $P_3$ is $(X_3, Y_3)$, a position coordinate of the third control point $P_4$ is $(X_4, Y_4)$, and a position coordinate of the third terminating point $P_5$ is $(X_5, Y_5)$. In the Bezier curve function, the definition of "$P_i$", "n", "$W_i$" and "t" are described in the above descriptions, and will not be described again. After the third initial point $P_3$, the third control point $P_4$ and the third terminating point $P_5$ are defined, the third profile curve B3 are further defined by constraints shown as $X_3=X_5$; $Y_3 \geq Y_4 \leq Y_5$; and $0 \leq W_i \leq 1$.

Referring to FIG. 5A to FIG. 5D again, in the fifth embodiment, the first profile curve B1 and the second profile curve B2 are formed from the same parameter values of the third embodiment, i.e. $P_0=(0,0)$, $P_1=(7.6,4.6)$, $P_2=(36,8.5)$ and $W_1=0.45$. As shown in FIG. 5C, the third profile curve B3 of the light guide element 500 is formed from the parameter values which are $P_3=(0,21)$, $P_4=(10.6,10.6)$, $P_5=(0,0)$ and $W_4=0.45$. As shown in FIG. 5B, the light beam enters the light guide element 500 from a light-incident surface 512, and is reflected out of the light-emitting surface 514 by the light guide element 500. In the present embodiment, the light beam is emitted from the light guide element 500 at a light beam angle of about 13 degrees. Therefore, from the first embodiment to the fifth embodiment above, adjusting each parameter value of the constraints may change the shape of the light-emitting surface 514.

Figure 6A:
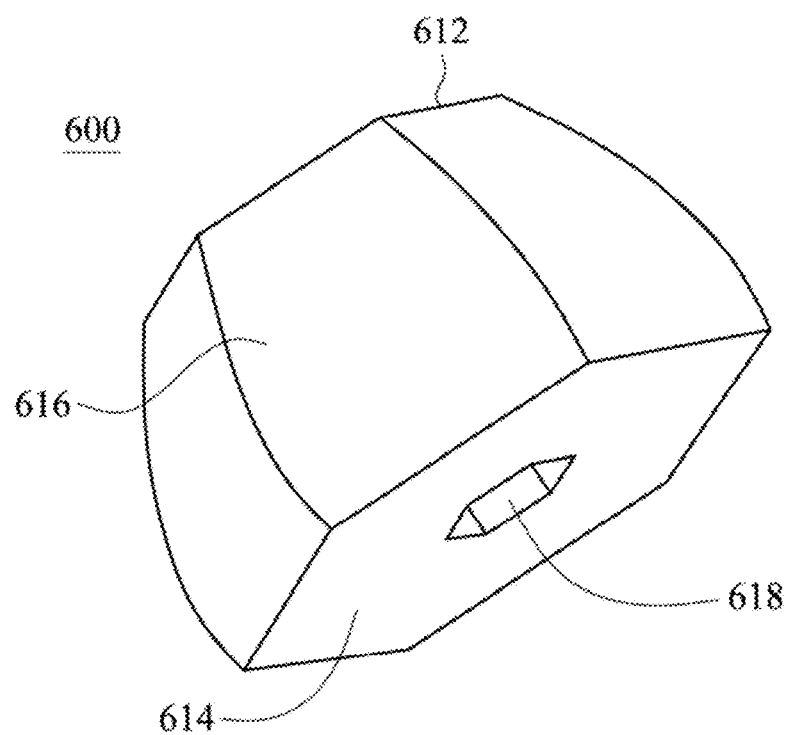
FIG. 6A is a schematic structural diagram showing a light guide element in accordance with a first example of a sixth embodiment of the present invention.
Figure 6B:
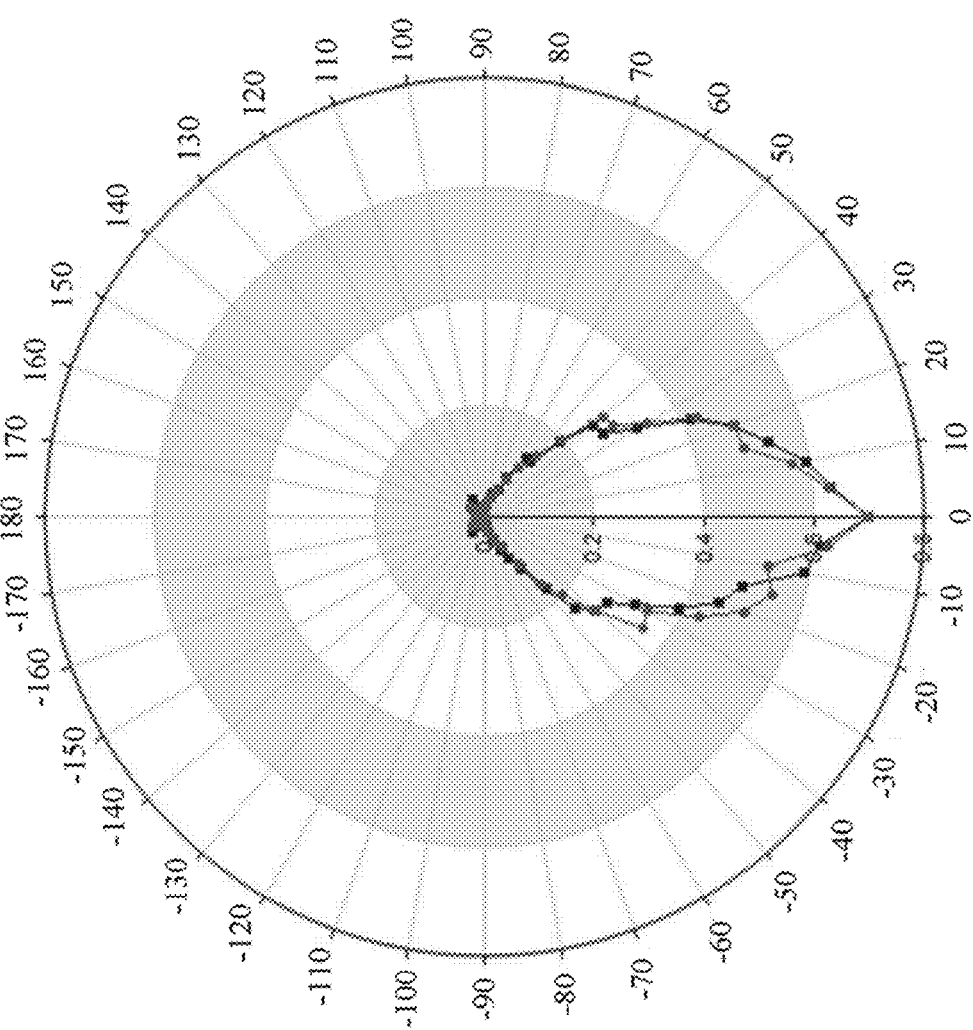
FIG. 6B is a candlepower distribution curve generated from the light guide element in accordance with the first example of the sixth embodiment of the present invention.

Referring to FIG. 6A and FIG. 6B, FIG. 6A is a schematic structural diagram a light guide element 600 in accordance with a first example of a sixth embodiment of the present invention; and FIG. 6B is a candlepower distribution curve generated from the light guide element 600 in accordance with the first example of the sixth embodiment of the present invention. In the present embodiment, the light guide element 600 includes a light-incident surface 612, a light-emitting surface 614, a first reflecting surface 616 and a second reflecting surface 618. The first reflecting surface 616 is formed from six first reflecting curved surfaces. Each of these first reflecting curved surfaces is constructed by the first profile curve B1. Similarly, the second reflecting surface 618 is formed from six second reflecting curved surfaces. Each of these second reflecting curved surfaces is constructed by the second profile curve B2.

Figure 7A:
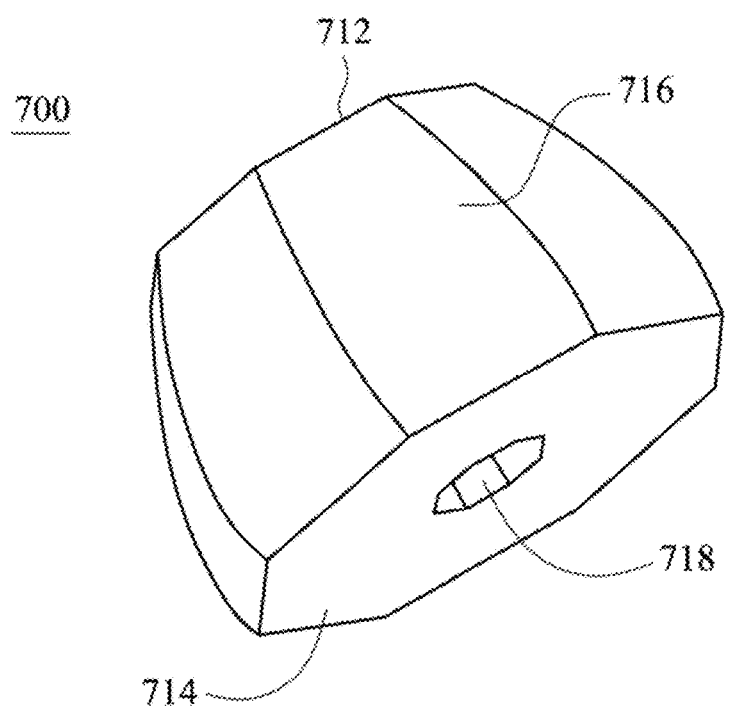
FIG. 7A is a schematic structural diagram showing a light guide element in accordance with a second example of the sixth embodiment of the present invention.
Figure 7B:
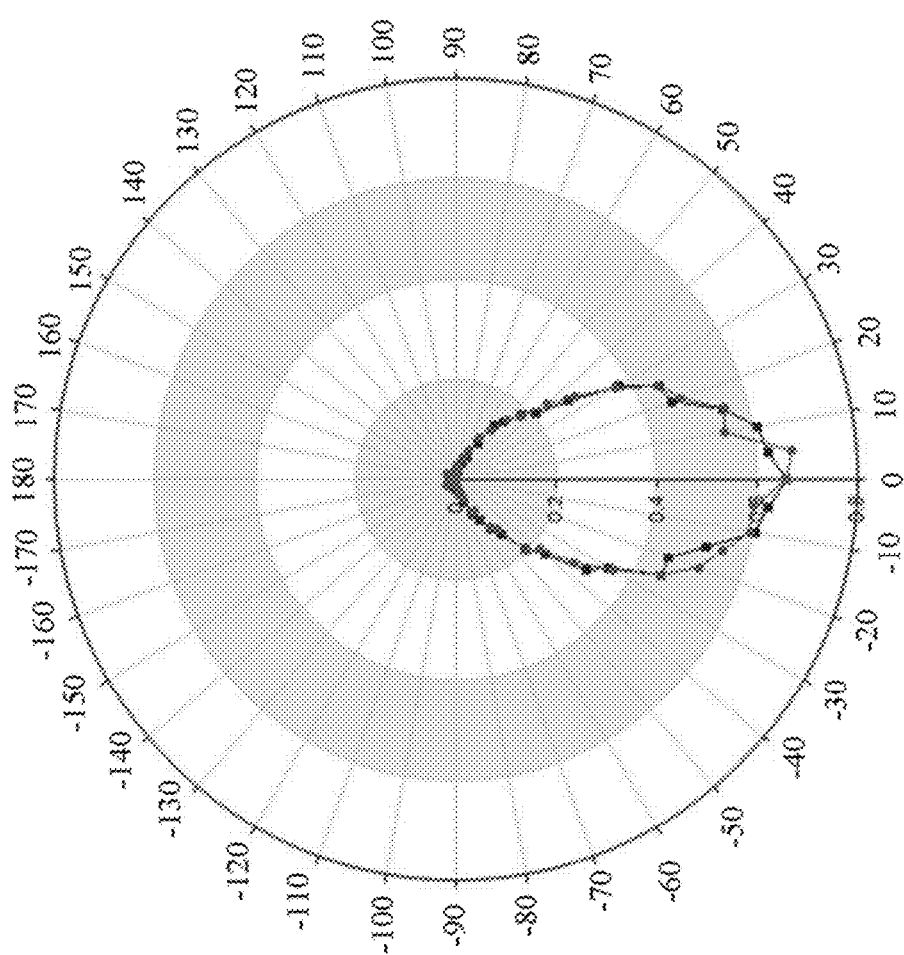
FIG. 7B is a candlepower distribution curve generated from the light guide element in accordance with the second example of the sixth embodiment of the present invention.

Referring to FIG. 7A and FIG. 7B, FIG. 7A is a schematic structural diagram a light guide element 700 in accordance with a second example of the sixth embodiment of the present invention; and FIG. 7B is a candlepower distribution curve generated from the light guide element 700 in accordance with the second example of the sixth embodiment of the present invention. In the present embodiment, the light guide element 700 includes a light-incident surface 712, a light-emitting surface 714, a first reflecting surface 716 and a second reflecting surface 718. The first reflecting surface 716 is formed from eight first reflecting curved surfaces. Each of these first reflecting curved surfaces is constructed by the first profile curve B1. Similarly, the second reflecting surface 618 is formed from eight second reflecting curved surfaces. Each of these second reflecting curved surfaces is constructed by the second profile curve B2.

Figure 8A:
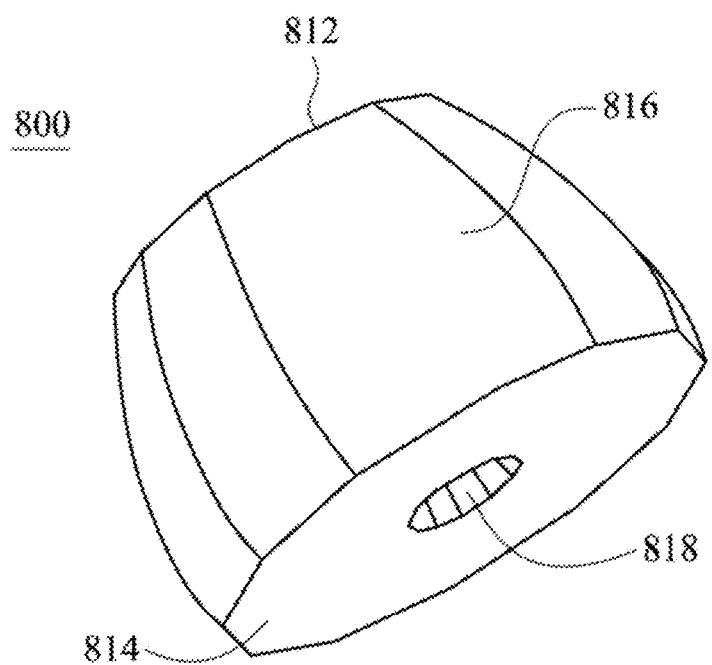
FIG. 8A is a schematic structural diagram showing a light guide element in accordance with a third example of the sixth embodiment of the present invention.
Figure 8B:
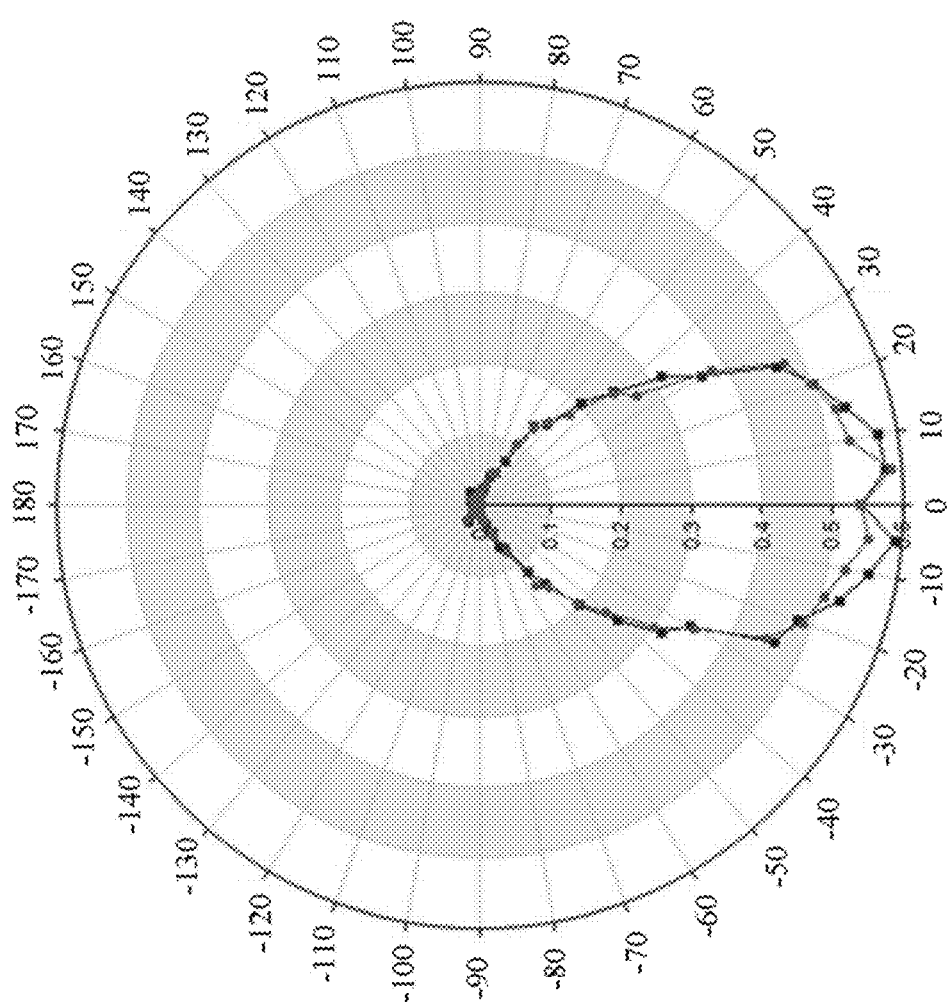
FIG. 8B is a candlepower distribution curve generated from the light guide element in accordance with the third example of the sixth embodiment of the present invention.

Referring to FIG. 8A and FIG. 8B, FIG. 8A is a schematic structural diagram of a light guide element 800 in accordance with a third example of the sixth embodiment of the present invention; and FIG. 8B is a candlepower distribution curve generated from the light guide element 800 in accordance with the third example of the sixth embodiment of the present invention. In the present embodiment, the light guide element 800 includes a light-incident surface 812, a light-emitting surface 814, a first reflecting surface 816 and a second reflecting surface 818. The first reflecting surface 816 is formed from twelve first reflecting curved surfaces. Each of these first reflecting curved surfaces is constructed by the first profile curve B1. Similarly, the second reflecting surface 618 is formed from twelve second reflecting curved surfaces. Each of these second reflecting curved surfaces is constructed by the second profile curve B2.

From the above, different shapes of the light guide elements, such as light guide element 600, 700 and 800 may form different light beam angles. It is noted that the number of the first reflecting curved surfaces and the second reflecting curved surfaces are described the same, it is possible to utilize different number of the first reflecting curved surfaces and the second reflecting curved surfaces. Additionally, the first profile curve B1 and the second profile curve B2 may be defined by the same profile curve or different profile curves. The following examples are directed to other modifications of the light guide element 600 of the sixth embodiment.

Figure 9A:
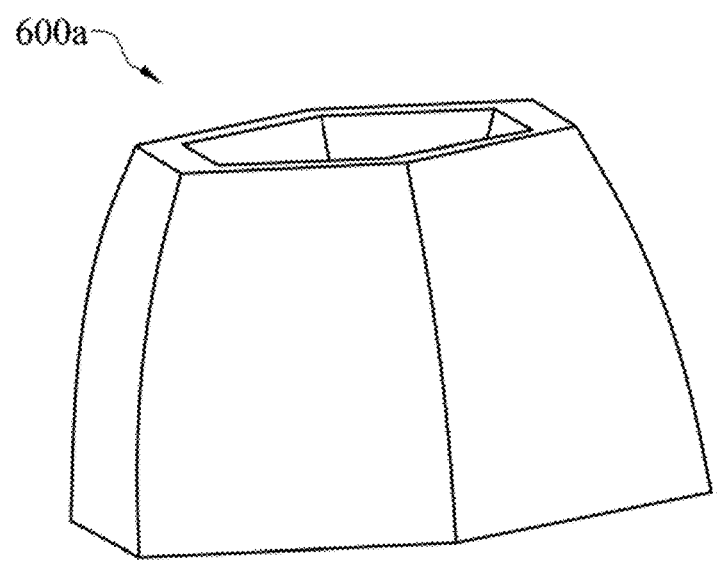
FIG. 9A is a schematic structural diagram showing a light guide element in accordance with a fourth example of the sixth embodiment of the present invention.
Figure 9B:
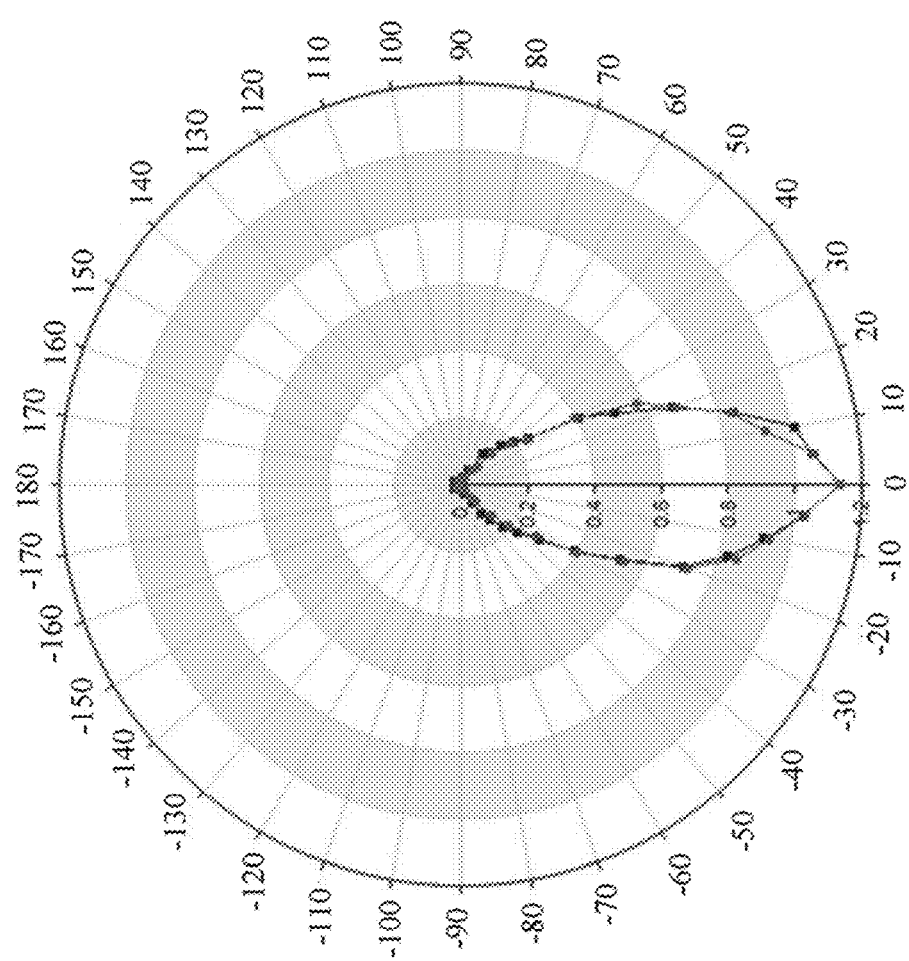
FIG. 9B is a candlepower distribution curve generated from the light guide element in accordance with the fourth example of the sixth embodiment of the present invention.

Referring to FIG. 9A and FIG. 9B, FIG. 9A is a schematic structural diagram of a light guide element 600a in accordance with a fourth example of the sixth embodiment of the present invention; and FIG. 9B is a candlepower distribution curve generated from the light guide element 600a in accordance with the fourth example of the sixth embodiment of the present invention. In the present embodiment, the first profile curve B1 of the light guide element 600a is formed from the parameter values which are $P_0=(0,0)$, $P_1=(10.3, 6.2)$, $P_2=(36,8.5)$ and $W_1=0.45$. The second profile curve B2 and the first profile curve B1 are symmetrical. In the present embodiment, the light beam is emitted from the light guide element 600a at a light beam angle of about 47 degrees.

Figure 10A:
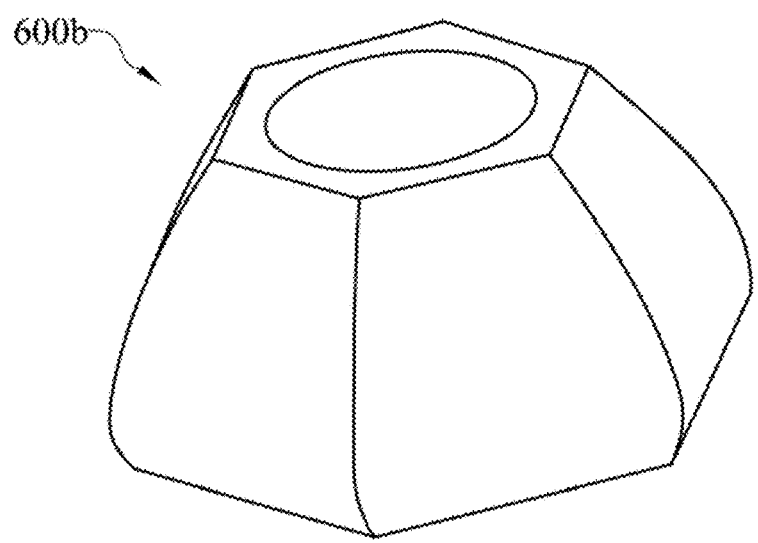
FIG. 10A is a schematic structural diagram showing a light guide element in accordance with a fifth example of the sixth embodiment of the present invention.
Figure 10B:
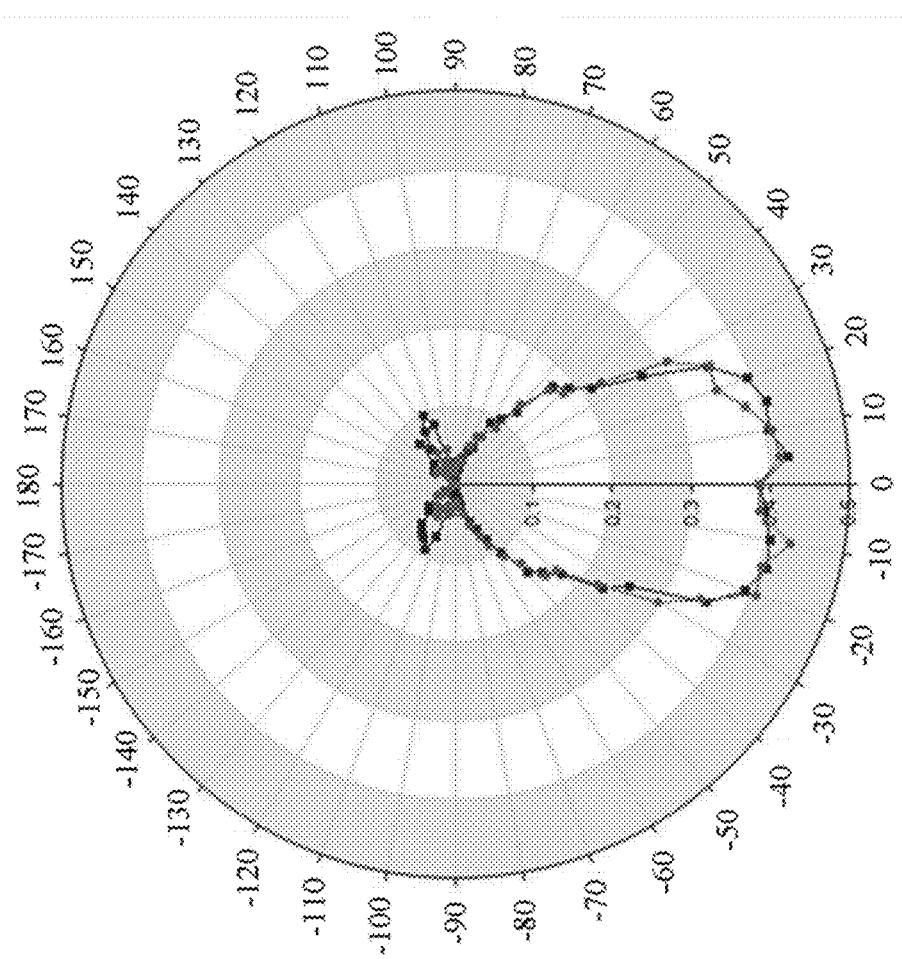
FIG. 10B is a candlepower distribution curve generated from the light guide element in accordance with the fifth example of the sixth embodiment of the present invention.

Referring to FIG. 10A and FIG. 10B, FIG. 10A is a schematic structural diagram of a light guide element 600b in accordance with a fifth example of the sixth embodiment of the present invention; and FIG. 10B is a candlepower distribution curve generated from the light guide element 600b in accordance with the fifth example of the sixth embodiment of the present invention. In the present embodiment, the first profile curve B1 of the light guide element 600b is formed from the parameter values which are $P_0=(0, 0)$, $P_1=(32.8,22.9)$, $P_2=(36,8.5)$ and $W_1=0.45$. The second profile curve B2 is formed from the parameter values which are $P'_0=(0,0)$, $P'_1=(10,15)$, $P'_2=(36,8.5)$ and $W_1=0$. In the present embodiment, the light beam is emitted from the light guide element 600b at a light beam angle of about 63 degrees.

Figure 11A:
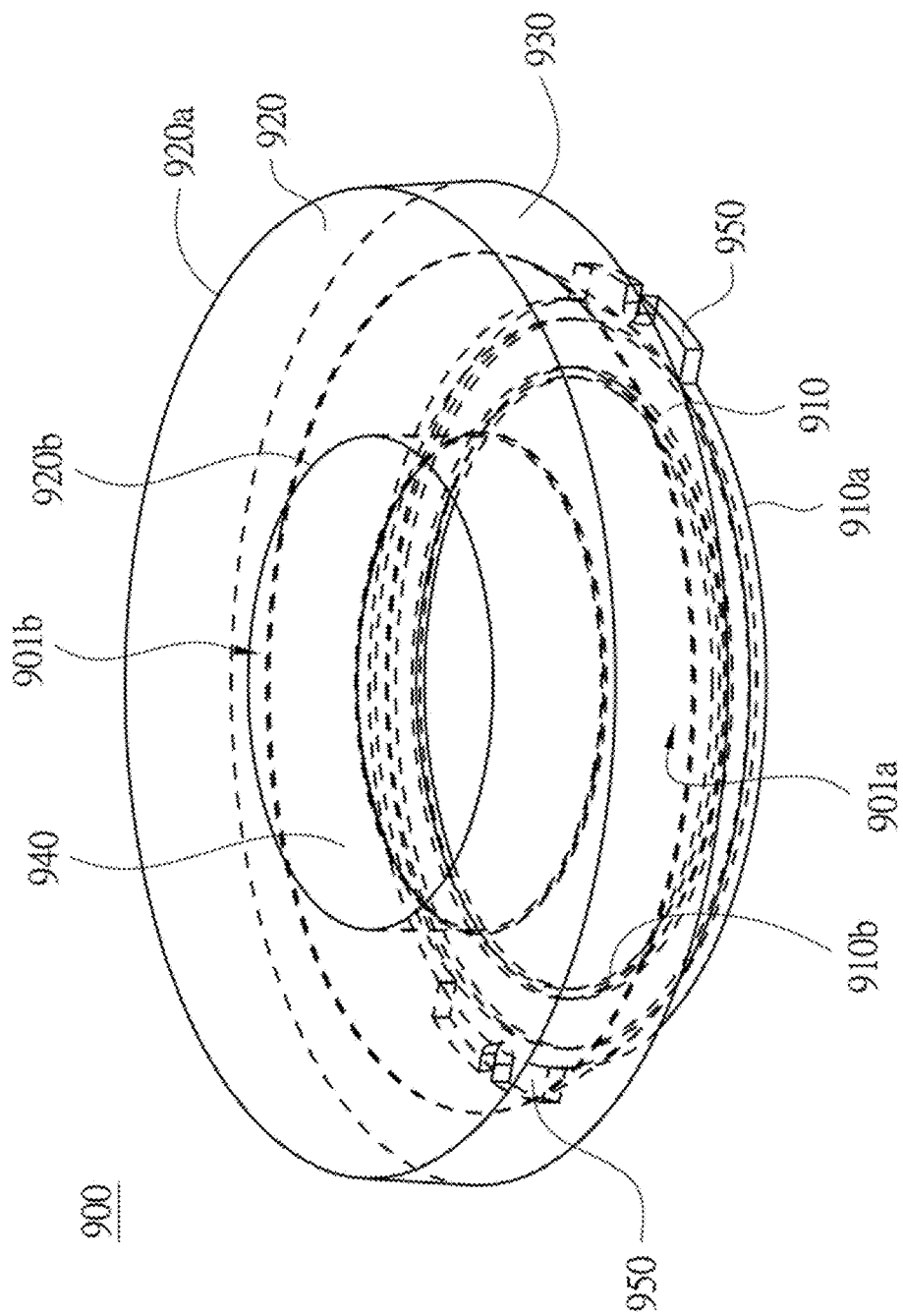
FIG. 11A is a schematic structural diagram showing a light guide element in accordance with a seventh embodiment of the present invention.
Figure 11B:
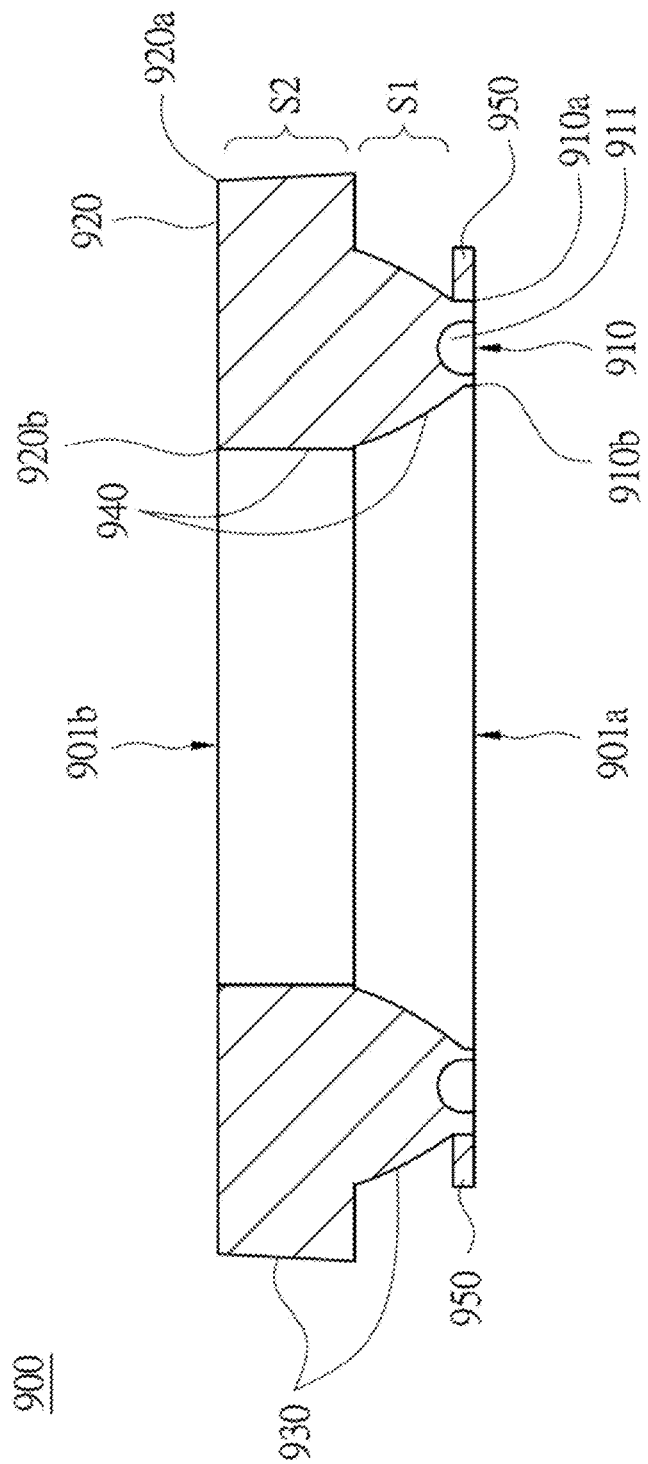
FIG. 11B is a schematic cross-sectional view showing the light guide element in accordance with the seventh embodiment of the present invention.

In the present invention, the aforementioned light guide elements may have different designs. Referring to FIG. 11A and FIG. 11B, FIG. 11A and FIG. 11B are a schematic structural diagram and a schematic cross-sectional view showing a light guide element 900 in accordance with a seventh embodiment of the present invention. The light guide element 900 is an annular frustum. The light guide element 900 includes a light-incident surface 910, a light-emitting surface 920, an outer surface 930 and an inner surface 940. The light-incident surface 910 has a first outer peripheral edge 910a and a first inner peripheral edge 910b. The light-emitting surface 920 is opposite to the light-incident surface 910 and has a second outer peripheral edge 920a and a second inner peripheral edge 920b.

As shown in FIG. 11A and FIG. 11B the outer surface 930 connects the first outer peripheral edge 910a and the second outer peripheral edge 920a, and the inner surface 940 connects the first inner peripheral edge 910b and the second inner peripheral edge 920b. Therefore, a first opening 901a can be defined by the inner surface 940 adjacent to the first inner peripheral edge 910b and the first opening 901a is located at the light-incident surface 910. In addition, a second opening 901b can be defined by the inner surface 940 adjacent to the second inner peripheral edge 920b and the second opening 901b is located at the light-emitting surface 920. The first opening 901a is larger than the second opening 901b. In other words, a diameter of the first opening 901a is larger than that of the second opening 901b. In one embodiment, the light guide element 900 has an annular trench 911 which is disposed on the light-incident surface 910. The annular trench 911 can be used to accommodate a light source of a lamp.

Figure 12A:
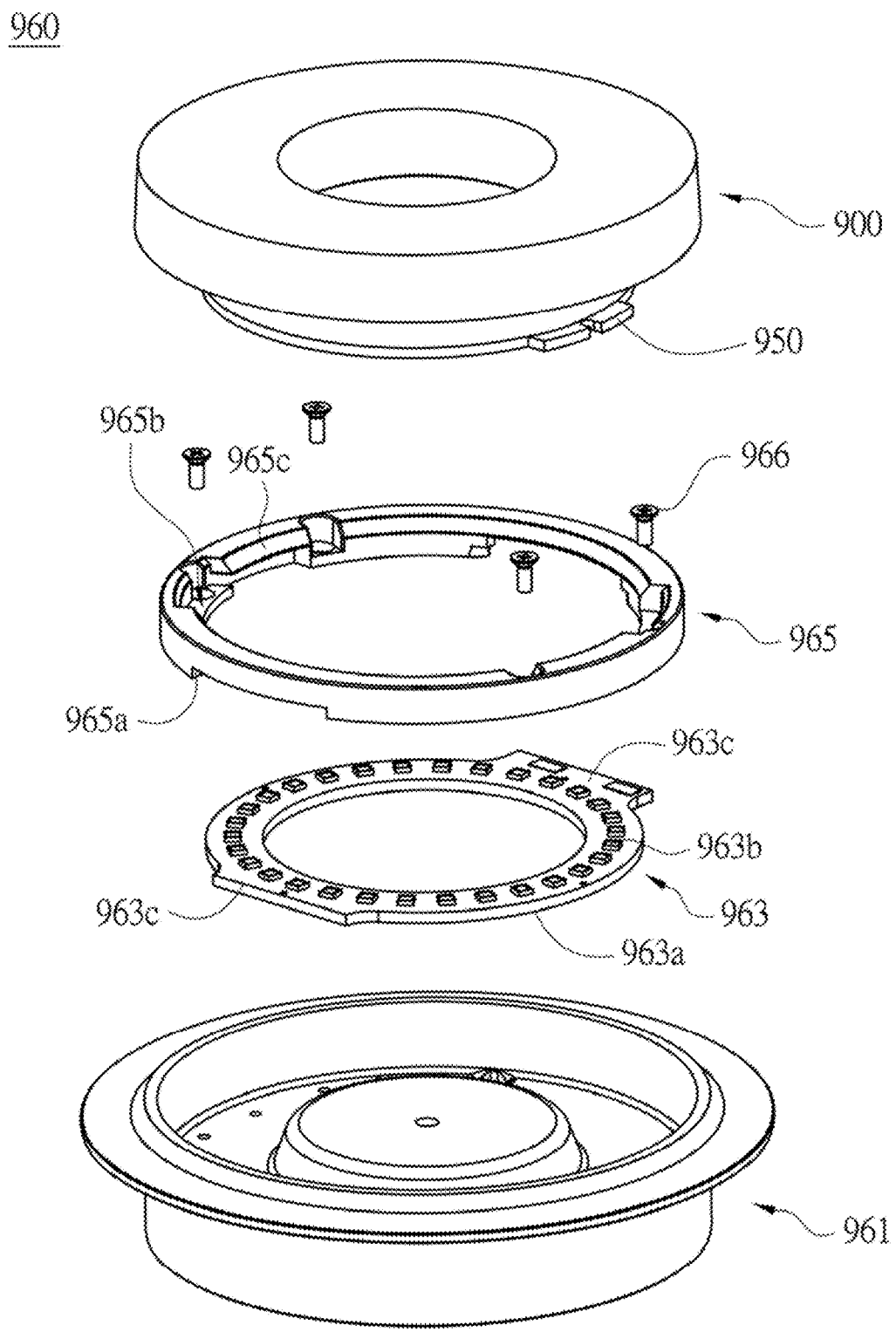
FIG. 12A is a schematic exploded view showing a lamp in accordance with a first embodiment of the present invention.
Figure 12B:
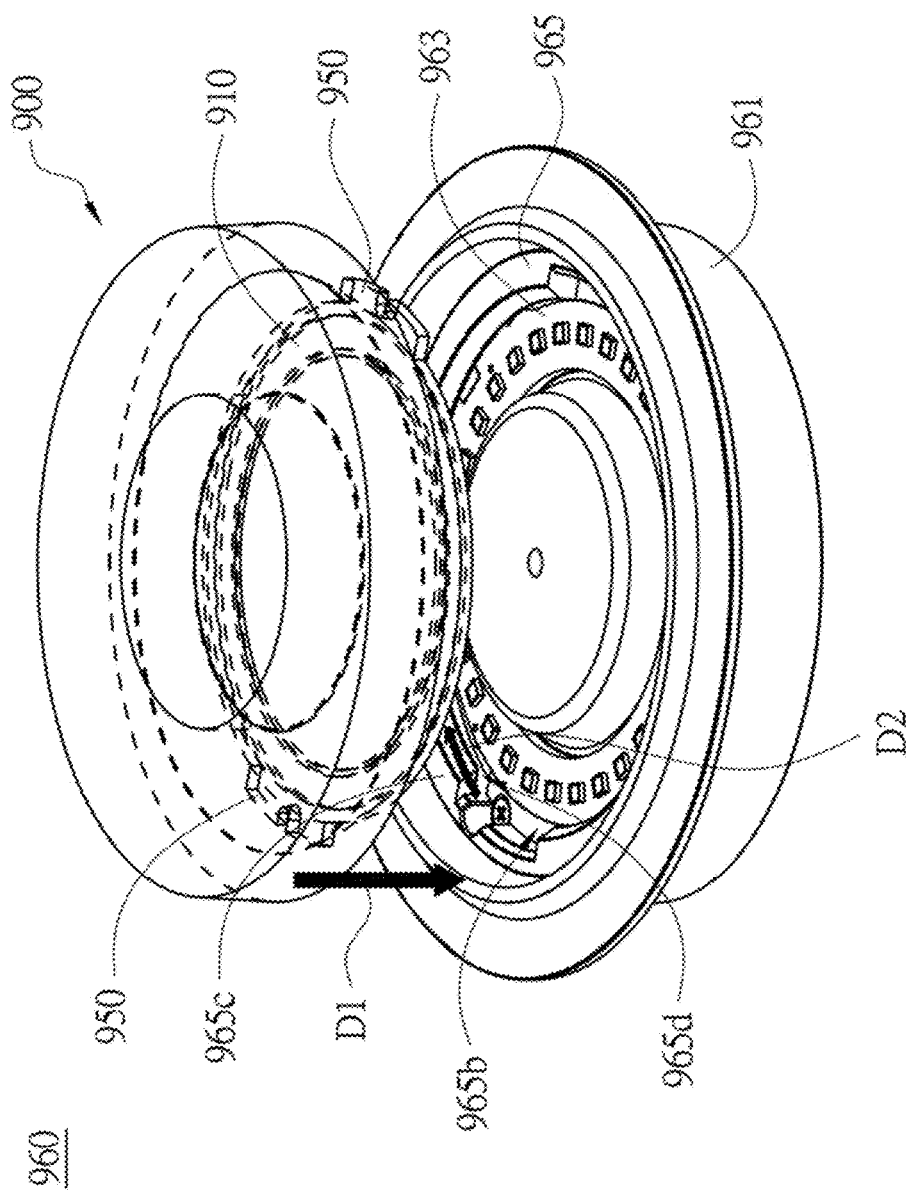
FIG. 12B is a schematic diagram showing a light guide element being engaged with a socket in accordance with the first embodiment of the present invention.
Figure 12C:
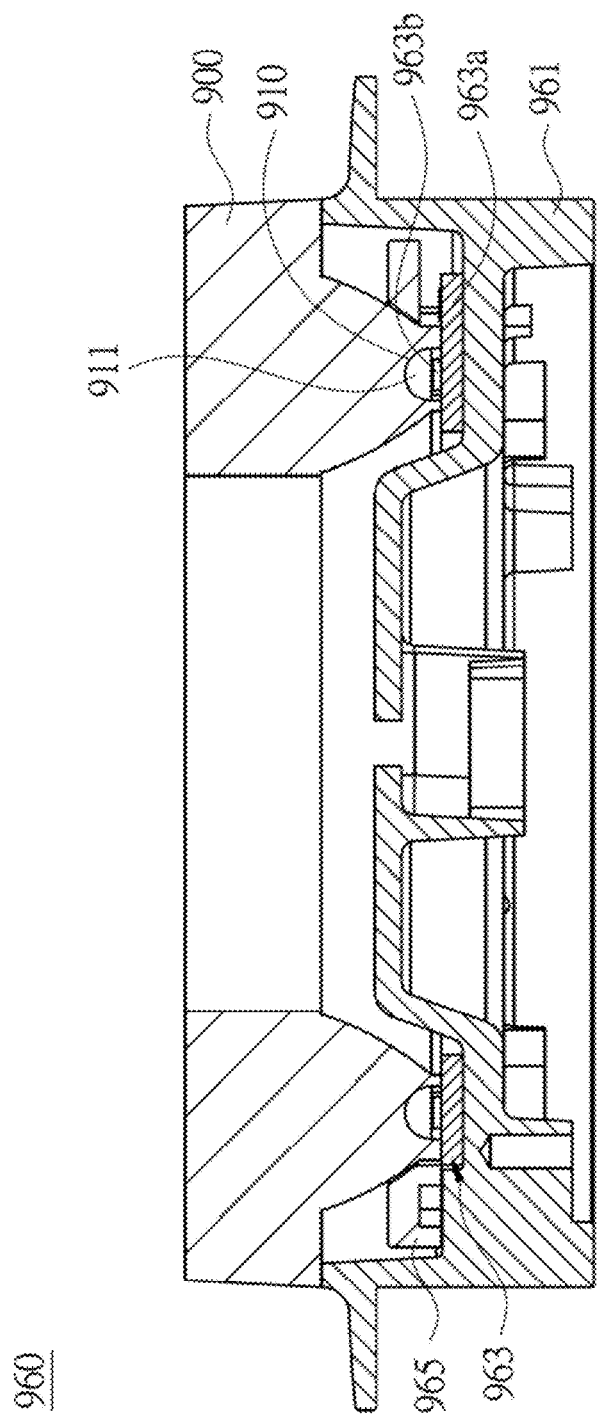
FIG. 12C is a cross-sectional view showing the lamp in accordance with the first embodiment of the present invention.

Referring to FIG. 11A and FIG. 11B again, the light guide element 900 has a first segment S1 and a second segment S2. The first segment S1 has curvature. In other words, one or both of the outer surface 930 and the inner surface 940 of the first segment S1 can be annular curved surface. In one embodiment, the curved surface can also be defined by the aforementioned profile curves. The second segment S2 does not have curvature. In other words, both of the outer surface 930 and the inner surface 940 of the second segment S2 are annular flat surface. As shown, in FIG. 11A and FIG. 11B, the second segment S2 is more protruding than the first segment S1, so that a diameter of the second segment S2 is larger than that of the first segment S1. Referring to FIG. 12A-12C, in which FIG. 12A is a schematic exploded views showing a lamp 960 in accordance with a first embodiment of the present invention, FIG. 12B is a schematic diagram showing the light guide element 900 being engaged with a socket in accordance with the first embodiment of the present invention, and FIG. 12C is a cross-sectional view showing the lamp 960 in accordance with the first embodiment of the present invention.

In the present invention, the lamp 960 includes a base 961, a light source 963, a socket 965 and the light guide element 900. The light source 963 is disposed on the base 961. In one embodiment, the light source 963 includes a circuit board 963a and plural light emitting diodes 963b disposed on the circuit board 963a, in which the circuit board 963a has a protruding portion 963c. The socket 965 is fixed on the base 961 by screwing members 966. As shown in FIG. 12A, the socket 965 has a notch 965a corresponding to the protruding portion 963c of the circuit board 963a, so that when the socket 965 is fixed on the base 961, the protruding portion 963c is positioned by the notch 965a, and the light source 963 can be fixed by the socket 965 accordingly.

Referring to FIG. 12A-12C again, the socket 965 further has a recess portion 965b and a flange 965c adjacent to the recess portion 965b. As shown in FIG. 12B, when the socket 965 is fixed on the base 961, an accommodating space 965d is formed between the flange 965c and the base 961. Moreover, the light guide element 900 includes a convex lug 950 adjacent to the light-incident surface 910. Therefore, the light guide element 900 can be first moved along a first direction D1 to put the convex lug 950 into the recess portion 965b of the socket 965, and then be rotated along a second direction D2 to move the convex lug 950 into the accommodating space 965d, thus engaging the light guide element 900 with the socket 965. As shown in FIG. 12C, when the light guide element 900 is engaged with the socket 965, the light emitting diodes 963b are located in the annular trench 911 of the light guide element 900, thereby emitting light towards the light-incident surface 910.

In the present invention, the aforementioned lamp may have different designs. Referring to FIG. 13, FIG. 13 is a cross-sectional view showing a lamp 1000 in accordance with a second embodiment of the present invention. The lamp 1000 includes a first light guide element 1100, a first light source 1200, a second light guide element 2100 and a second light source 2200.

Referring to FIG. 13 again, the first light guide element 1100 includes a first light-incident surface 1110, a first light-emitting surface 1120, a first outer surface 1130, a first inner surface 1140 and a groove 1150. The first light-incident surface 1110 has a first outer peripheral edge 1111 and a first inner peripheral edge 1112. The first light-emitting surface 1120 has a second outer peripheral edge 1121 and a second inner peripheral edge 1122. As shown in FIG. 13, the first outer surface 1130 connects the first outer peripheral edge 1111 and the second outer peripheral edge 1121, and the first inner surface 1140 connects the first inner peripheral edge 1112 and the second inner peripheral edge 1122. Therefore, a first opening 1101 can be defined by the first inner surface 1140 adjacent to the first inner peripheral edge 1112. in addition, a second opening 1102 can be defined by the first inner surface 1140 adjacent to the second inner peripheral edge 1122. In the present embodiment, a diameter of the first opening 1101 is larger than a diameter of the second opening 1102, and the area of the first light-incident surface 1110 is smaller than the area of the first light-emitting surface 1120. In some embodiments, the first outer peripheral edge 1111 is extends outwardly to the second outer peripheral edge 1121, and the first inner peripheral edge 1112 extends inwardly to the second inner peripheral edge 1122

Referring to FIG. 13 again, the groove 1150 is disposed on the first light-incident surface 1110 and has a curved surface 1151. In one embodiment, the groove 1150 is an annular trench which can be used to accommodate the first light source 1200. In other words, the first light source 1200 is disposed within the groove 1150 and faces the curved surface 1151 of the groove 1150. The first light source 1200 is used to emit light into the first light guide element 1100.

As shown in FIG. 13, in one embodiment, the first light guide element 1100 is an annular structure which has a hollow portion 1100a. The second light guide element 2100 is d posed in the hollow portion 1100a. In other words, the second light guide element 2100 is disposed between the first opening 1101 and the second opening 1102. In one present embodiment, the second light guide element 2100 is a convex lens. The second light source 2200 faces a second light-incident surface 2110 of the second light guide element 2100, and the second light source 2200 is used to emit light into the second light guide element 2100. Therefore, the first light source 1200 and the second light source 2200 can emit light simultaneously, singly or alternately, so as to form different illumination ranges.

In some embodiments, the aforementioned lamp may have different designs. Referring to FIG. 14, FIG. 14 is a cross-sectional view showing a lamp 3000 in accordance with a third embodiment of the present invention. The lamp 3000 is similar to the aforementioned lamp 1000, and the main difference therebetween is that the structures of a second light guide element 4100 and a second light source 4200 of the lamp 3000 are different. The second light guide element 4100 has a second light-incident surface 4110, a second light-emitting surface 4120, a second outer surface 4130 and a second inner surface 4140.

Referring to FIG. 14 again, the second light-incident surface 4110 has a third outer peripheral edge 4111 and a third inner peripheral edge 4112. The second light-emitting surface 4120 has a fourth outer peripheral edge 4121 and a fourth inner peripheral edge 4122. As shown in FIG. 14, the second outer surface 4130 connects the third outer peripheral edge 4111 and the fourth outer peripheral edge 4121, and the second inner surface 4140 connects the third inner peripheral edge 4112 and the fourth inner peripheral edge 4122. Therefore, a third opening 4101 can be defined by the second inner surface 4140 adjacent to the third inner peripheral edge 4112. In addition, a fourth opening 4102 can be defined by the second inner surface 4140 adjacent to the fourth inner peripheral edge 4122. In the present embodiment, a diameter of the third opening 4101 is larger than a diameter of the fourth opening 4102, and the area of the second light-incident surface 4110 is smaller than the area of the second light-emitting surface 4120.

As shown in FIG. 14, the second light guide element 4100 is disposed in the hollow portion 1100a of the first light guide element 1100. In other words, the second light guide element 4100 is disposed between the first opening 1101 and the second opening 1102 of the first light guide element 1100. In the present embodiment, the second light guide element 2100 an annular structure. The second light source 4200 faces the second light-incident surface 4110 of the second light guide element 4100, and the second light source 4200 is used to emit light into the second light guide element 4100. Therefore, the first light source 1200 and the second light source 4200 can emit light simultaneously, singly or alternately, so as to form different illumination ranges.

Figure 15:
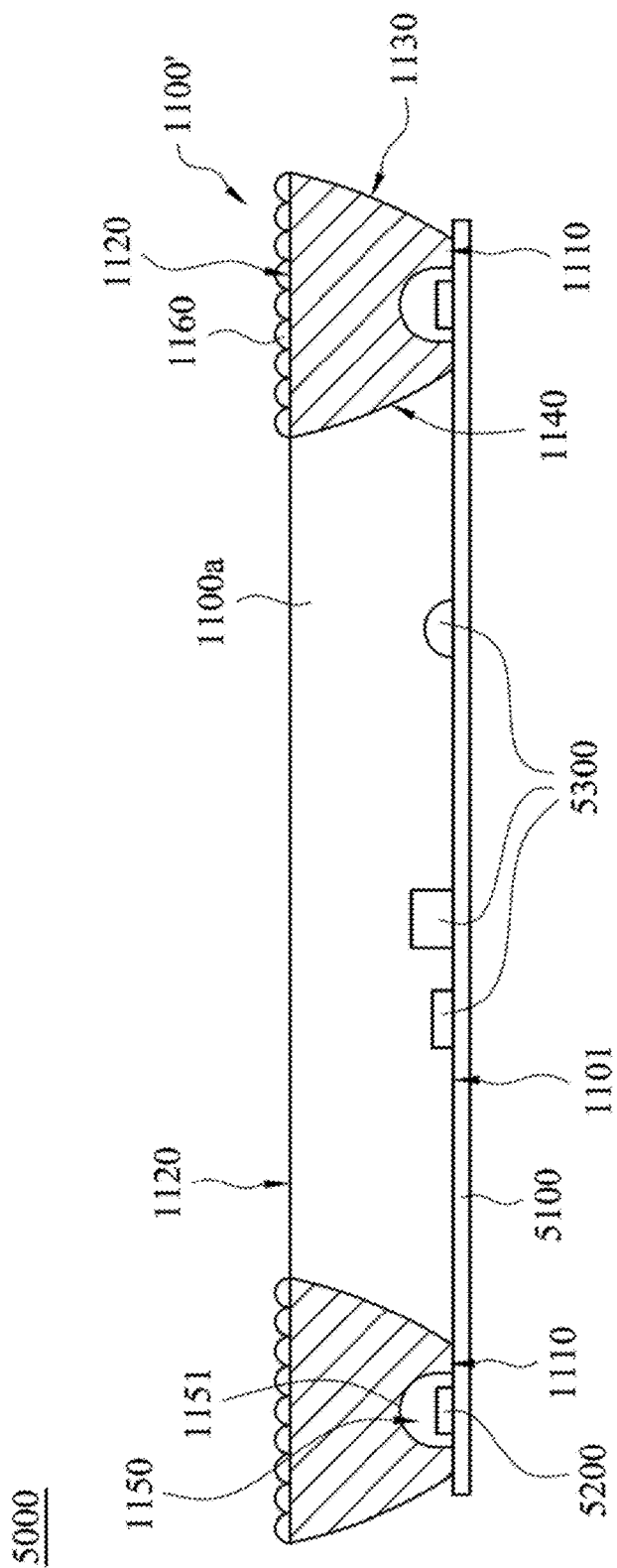
FIG. 15 is a cross-sectional view showing a lamp in accordance with a fourth embodiment of the present invention.

Referring to FIG. 15, FIG. 15 is a cross-sectional view showing a lamp 5000 in accordance with a fourth embodiment of the present invention. The lamp 5000 includes a light guide element 1100', a base 5100, a light source 5200, and a circuit device 5300. The structure of the light guide element 1100' is similar to the aforementioned first light guide element 1100, and the main difference therebetween is that the light guide element 1100 further includes a plurality of light-emitting microstructures 1160 disposed on the first light-emitting surface 1120. The light-emitting microstructures 1160 are used to mix and refract light provided by the light source 5200 and emitted from the first light-emitting surface 1120, so as to increase light uniformity of the lamp 5000.

Referring to FIG. 15 again, the light source 5200 and the circuit device 5300 are disposed on the base 5100, in which the circuit device 5300 is located in the hollow portion 1100a between the first opening 1101 and the second opening 1102 of the light guide element 1100', and the light source 5200 is disposed within the groove 1150 the light guide element 1100' and faces the curved surface 1151 of the groove 1150. in one embodiment, the base 5100 is a circuit board, and the circuit device 5300 is a driver which is used to control the light source 5200.

Figure 16:
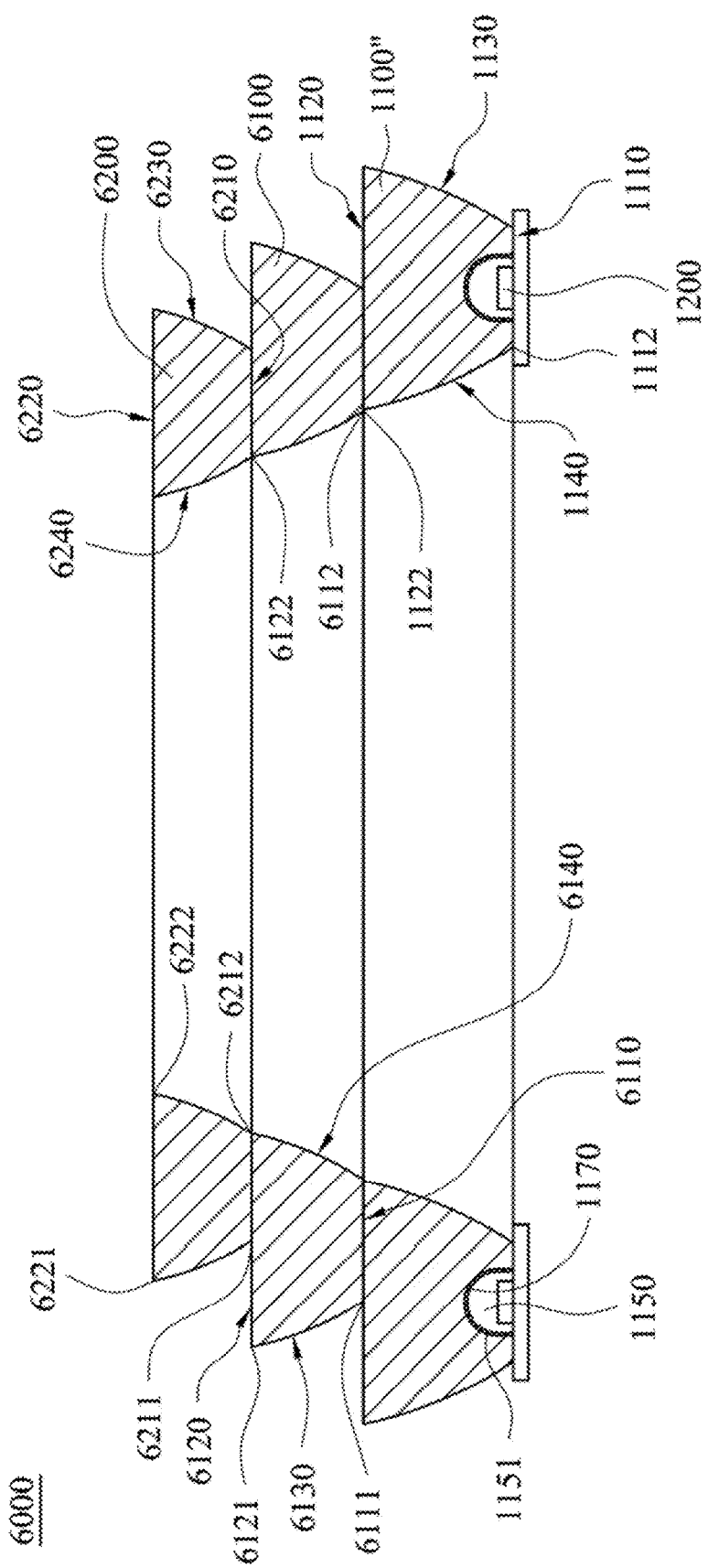
FIG. 16 is a cross-sectional view showing a lamp in accordance with a fifth embodiment of the present invention.

Referring to FIG. 16, FIG. 16 is a cross-sectional view showing a lamp 6000 in accordance with a fifth embodiment of the present invention. The lamp 6000 includes a first light guide element 1100", at least one second light guide element (i.e. a light guide element 6100 and a light guide element 6200) and the aforementioned first light source 1200. The structure of the first light guide element 1100" is similar to the aforementioned first light guide element 1100, and the main difference therebetween is that the first light guide element 1100" further includes a plurality of light-incident microstructures 1170 disposed on the curved surface 1151 of the groove 1150. The light-incident microstructures 1170 are used to mix and refract light provided by the first light source 1200 and entering the first light guide element 1100", so as to increase light uniformity of the lamp 6000. In some embodiments, the light-incident microstructures 1170 can be simultaneously disposed on the curved surface 1151 and the first light-incident surface 1110.

Referring to FIG. 16 again, the second light guide element 6100 is disposed above the first light guide element 1100". More specifically, the second light guide element 6100 is disposed on the first light-emitting surface 1120 of the first light guide element 1100". The second light guide element 6100 has a second light-incident surface 6110, a second light-emitting surface 6120, a second outer surface 6130 and a second inner surface 6140. The second light-incident surface 6110 has a third outer peripheral edge 6111 and a third inner peripheral edge 6112. The second light-emitting surface 6120 has a fourth outer peripheral edge 6121 and a fourth inner peripheral edge 6122. As shown in FIG. 16, the second outer surface 6130 connects the third outer peripheral edge 6111 and the fourth outer peripheral edge 6121, and the second inner surface 6140 connects the third inner peripheral edge 6112 and the fourth inner peripheral edge 6122. In one embodiment, the third inner peripheral edge 6112 of the second light guide element 6100 is connected to the second inner peripheral edge 1122 of the first light guide element 1100".

As shown in FIG. 16, the second light guide element 6200 is disposed above the second light guide element 6100. More specifically, the second light guide element 6200 is disposed on the second light-emitting surface 6120 of the second light guide element 6100. The second light guide element 6200 has a second light-incident surface 6210, a second light-emitting surface 6220, a second outer surface 6230 and a second inner surface 6240. The second light-incident surface 6210 has a third outer peripheral edge 6211 and a third inner peripheral edge 6212. The second light-emitting surface 6220 has a fourth outer peripheral edge 6221 and a fourth inner peripheral edge 6222 As shown in FIG. 16, the second outer surface 6230 connects the third outer peripheral edge 6211 and the fourth outer peripheral edge 6221, and the second inner surface 6240 connects the third inner peripheral edge 6212 and the fourth inner peripheral edge 6222. In one embodiment, the third inner peripheral edge 6212 of the second light guide element 6200 is connected to the fourth inner peripheral edge 6122 of the second light guide element

6100. Therefore, light generated from the light source 1200 can enter the first light guide element 1100", the second light guide element 6100 and the second light guide element 6200 sequentially, thereby achieving light concentration effect.

According to the aforementioned embodiments of the present invention, one advantage of the present invention is using profile curves to change curved surface shapes of a first reflecting surface, a second reflecting surface and a light-emitting surface of a light guide element, thereby adjusting a travel direction of the light beam in the light guide element to achieve an object of adjusting the light form emitted from the light guide element. Furthermore, by using a total reflection characteristic of the light beam to change a travel direction of the light beam can achieve an object of adjusting the light form emitted from the light guide element. Therefore, the applications of the light guide element may meet irradiation requirements of various light beam angles, and also reduce power consumption. Additionally, using the Bezier curve function to define respective profile curves can not only simplify definition rules of respective curved surfaces but also can control an overall profile shape of the light guide element in an intuitive manner.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lamp, comprising:
   a first light guide element comprising:
      a first light incident surface having a first outer peripheral edge and a first inner peripheral edge;
      a first light-emitting surface which is opposite to the first light-incident surface and has a second outer peripheral edge and a second inner peripheral edge;
      a first outer surface connecting the first outer peripheral edge and the second outer peripheral edge;
      a first inner surface connecting the first inner peripheral edge and the second inner peripheral edge; and
      a groove located at the first light-incident surface and having a curved surface;
      wherein a first opening defined by the first inner surface adjacent to the first inner peripheral edge is larger than a second opening defined by the first inner surface adjacent to the second inner peripheral edge;
      wherein the area of the first light-incident surface is smaller than the area of the first light-emitting surface; and
   a first light source disposed within the groove and facing the curved surface of the groove.

2. The lamp of claim 1, further comprising:
   a second light guide element disposed between the first opening and the second opening; and
   a second light source facing a second light-incident surface of the second light guide element.

3. The lamp of claim 2, wherein the second light guide element is a convex lens.

4. The lamp of claim 2, wherein first light source and the second light source can emit light simultaneously, singly or alternately.

5. The lamp of claim 2, wherein the second light guide element comprises:
   a second light-incident surface having third outer peripheral edge and a third inner peripheral edge;
   a second light-emitting surface which is opposite to the second light-incident surface and has a fourth outer peripheral edge and a fourth inner peripheral edge;
   a second outer surface connecting the third outer peripheral edge and the fourth outer peripheral edge; and
   a second inner surface connecting the third inner peripheral edge and the fourth inner peripheral edge;
   wherein a third opening defined by the second inner surface adjacent to the third inner peripheral edge is larger than a fourth opening defined by the second inner surface adjacent to the fourth inner peripheral edge;
   wherein the area of the second light-incident surface is smaller than the area of the second light-emitting surface.

6. The lamp of claim 5, wherein first light source and the second light source can emit light simultaneously, singly or alternately.

7. The lamp of claim 1, further comprising at least one second light guide element, wherein the second light guide element is located on the second light-emitting surface of the first light guide element.

8. The lamp of claim 7, wherein the second light guide element comprises:
   a second light-incident surface having a third outer peripheral edge and a third inner peripheral edge;
   a second light-emitting surface which is opposite to the second light-incident surface and has a fourth outer peripheral edge and a fourth inner peripheral edge;
   a second outer surface connecting the third outer peripheral edge and the fourth outer peripheral edge;
   a second inner surface connecting the third inner peripheral edge and the fourth inner peripheral edge; and
   wherein a third opening defined by the second inner surface adjacent to the third inner peripheral edge is larger than a fourth opening defined by the second inner surface adjacent to the fourth inner peripheral edge;
   wherein the area of the second light-incident surface is smaller than the area of the second light-emitting surface.

9. The lamp of claim 8, wherein the third inner peripheral edge of the second light guide element is connected to the second inner peripheral edge of the first light guide element.

10. The lamp of claim 8, wherein the at least one second light guide element is more than one, and the third inner peripheral edge of one of the second light guide element is connected to the fourth inner peripheral edge of another second light guide element.

11. The lamp of claim 1, wherein the first light guide element further comprises a plurality of light-incident microstructures disposed on the first light-incident surface and/or the curved surface.

12. The lamp of claim 1, wherein the first light guide element further comprises a plurality of light-emitting microstructures disposed on the first light-emitting surface.

13. The lamp of claim 1, further comprising:
   a base, wherein the first light source is disposed on the base; and
   a circuit device disposed on the base and located between the first opening and the second opening.

14. A lamp, comprising:
a first light guide element comprising:
- a first light-incident surface having a first outer peripheral edge and a first inner peripheral edge;
- a first light-emitting surface which is opposite to the first light-incident surface and has a second outer peripheral edge and a second inner peripheral edge;
- a first outer surface connecting the first outer peripheral edge and the second outer peripheral edge;
- a first inner surface connecting the first inner peripheral edge and the second inner peripheral edge; and
- a groove located at the first light-incident surface and having a curved surface;
- wherein the first outer peripheral edge extends outwardly to the second outer peripheral edge; and
- wherein the first inner peripheral edge extends inwardly to the second inner peripheral edge; and
a first light source disposed within the groove and facing the curved surface of the groove.

15. The lamp of claim 14, further comprising:
- a second light guide element disposed between a first opening defined by the first inner surface adjacent to the first inner peripheral edge and a second opening defined by the first inner surface adjacent to the second inner peripheral edge; and
- a second light source facing a second light-incident surface of the second light guide element.

16. The lamp of claim 15, wherein the second light guide element is a convex lens.

17. The lamp of claim 15, wherein first light source and the second light source can emit light simultaneously, singly or alternately.

18. The lamp of claim 15, wherein the second light guide element comprises:
- a second light-incident surface having a third outer peripheral edge and a third inner peripheral edge;
- a second light-emitting surface which is opposite to the second light-incident surface and has a fourth outer peripheral edge and a fourth inner peripheral edge;
- a second outer surface connecting the third outer peripheral edge and the fourth outer peripheral edge;
- a second inner surface connecting the third inner peripheral edge and the fourth inner peripheral edge; and
- wherein a third opening defined by the second inner surface adjacent to the third inner peripheral edge is larger than a fourth opening defined by the second inner surface adjacent to the fourth inner peripheral edge;
- wherein the area of the second light-incident surface is smaller than the area of the second light-emitting surface.

19. The lamp of claim 18, wherein first light source and the second light source can emit light simultaneously, singly or alternately.

20. The lamp of claim 14, further comprising at least one second light guide element, wherein the second light guide element is located on the second light-emitting surface of the first light guide element.

21. The lamp of claim 20, wherein the second light guide element comprises:
- a second light-incident surface having a third outer peripheral edge and a third inner peripheral edge;
- a second light-emitting surface which is opposite to the second light-incident surface and has a fourth outer peripheral edge and a fourth inner peripheral edge;
- a second outer surface connecting the third outer peripheral edge and the fourth outer peripheral edge;
- a second inner surface connecting the third inner peripheral edge and the fourth inner peripheral edge; and
- wherein a third opening defined by the second inner surface adjacent to the third inner peripheral edge is larger than a fourth opening defined by the second inner surface adjacent to the fourth inner peripheral edge;
- wherein the area of the second light-incident surface is smelter than the area of the second light-emitting surface.

22. The lamp of claim 21, wherein the third inner peripheral edge of the second light guide element is connected to the second inner peripheral edge of the first light guide element.

23. The lamp of claim 21, wherein the at least one second light guide element is more than one, and the third inner peripheral edge of one of the second light guide element is connected to the fourth inner peripheral edge of another second light guide element.

24. The lamp of claim 14, wherein the first light guide element further comprises a plurality of light-incident microstructures disposed on the first light-incident surface and/or the curved surface.

25. The lamp of claim 14, wherein the first light guide element further comprises a plurality of light-emitting microstructures disposed on the first light-emitting surface.

26. The lamp of claim 14, further comprising:
- a base, wherein the first light source is disposed on the base; and
- a circuit device disposed on the base and located between the first opening and the second opening.

* * * * *